US012791394B2

(12) United States Patent
Carilli et al.

(10) Patent No.: US 12,791,394 B2
(45) Date of Patent: Nov. 10, 2026

(54) METHODS AND SYSTEMS FOR TWO-DIMENSIONAL DETERMINATION OF THE SIZE AND SHAPE OF A BRIGHT, MICRON-SIZE LIGHT SOURCE USING INTERFEROMETRY WITH A TWO-DIMENSIONAL NON-REDUNDANT APERTURE MASK, INCLUDING METHODS AND SYSTEMS FOR WAVEFRONT SENSING

(71) Applicant: Associated Universities, Inc., Vienna, VA (US)

(72) Inventors: Christopher L. Carilli, Socorro, NM (US); Bojan Nikolic, Cambridge (GB); Nithyanandan Thyagarajan, Wilson (AU); Laura Torino, Barcelona (ES); Ubaldo Iriso, Barcelona (ES)

(73) Assignee: Associated Universties, Inc., Vienna, VA (US)

( * ) Notice: Subject to any disclaimer, the term of this patent is extended or adjusted under 35 U.S.C. 154(b) by 43 days.

(21) Appl. No.: 19/079,876

(22) Filed: Mar. 14, 2025

(65) Prior Publication Data

US 2025/0354872 A1 Nov. 20, 2025

Related U.S. Application Data

(60) Provisional application No. 63/648,284, filed on May 16, 2024, provisional application No. 63/648,303, filed on May 16, 2024.

(30) Foreign Application Priority Data

May 16, 2024 (GB) ..................................... 2406928

(51) Int. Cl.
*G01J 9/02* (2006.01)
*G01B 9/02* (2022.01)

(52) U.S. Cl.
CPC ............ *G01J 9/02* (2013.01); *G01B 9/02043* (2013.01); *G01J 2009/0238* (2013.01)

(58) Field of Classification Search
CPC .. G01B 9/02043; G01J 1/0437; G01J 1/4228; G01J 1/4257; G01J 2001/4247;
(Continued)

(56) References Cited

U.S. PATENT DOCUMENTS 12,104,901 B2 10/2024 Carilli et al.
2007/0268536 A1* 11/2007 Holmes .................. B42D 25/29 359/2

(Continued)

FOREIGN PATENT DOCUMENTS

WO 2023250184 12/2023

OTHER PUBLICATIONS

PCT Search Report and Written Opinion for PCT App. No. PCT/US25/29496, dated Jul. 15, 2025.

(Continued)

*Primary Examiner* — Hina F Ayub
(74) *Attorney, Agent, or Firm* — Remenick PLLC

(57) ABSTRACT

Systems and methods for a non-invasive determination of the characteristics of a light source include placing a non-redundant aperture mask in a path of light emanating from the light source, capturing an image of the interference pattern caused by the light passing through the non-redundant aperture mask, generating visibilities of the light distribution from the image, and determining the characteristics of the light source based on the visibilities of the light distribution, including a process of self-calibration in which the phase-solutions provide a sub-nanometer precision wavefront sensor, and through the use of closure amplitudes without requiring the process of self-calibration.

44 Claims, 16 Drawing Sheets

(58) Field of Classification Search
CPC ....... G01J 2009/0234; G01J 2009/0238; G01J 9/02; G01J 9/0215; G01T 1/295; G06T 2207/20056; G06T 7/521
See application file for complete search history.

(56) References Cited

U.S. PATENT DOCUMENTS

| | | | |
|---|---|---|---|
| 2022/0301256 | A1 | 9/2022 | Xu |
| 2023/0017478 | A1 | 1/2023 | Thyagarajan |
| 2024/0053143 | A1 | 2/2024 | de Groot |

OTHER PUBLICATIONS

Sallum et al., Data Reduction and Image Reconstruction Techniques for Non-Redundant Masking, The Astrophysical Journal Supplement Serries 233:9 (22pp) Nov. 2017.
Sallum et al., Comparing Non-Redundant Masking and Filled-Aperture Kernel Phase for Exoplanet Detection and Characterization, UC Santa Cruz, Dept. of Astronomy and Astrophysics, Jan. 2019.
Greenbaum et al., An Image-Plane Algorithm for JWST'S Non-Redundant Aperture Mask Data, The Astrophysical Journal, 798:68 (14pp), Jan. 10, 2015.
U.S. Appl. No. 18/878,488, filed Dec. 23, 2024, Carilli, et al.

* cited by examiner

METHODS AND SYSTEMS FOR TWO-DIMENSIONAL DETERMINATION OF THE SIZE AND SHAPE OF A BRIGHT, MICRON-SIZE LIGHT SOURCE USING INTERFEROMETRY WITH A TWO-DIMENSIONAL NON-REDUNDANT APERTURE MASK, INCLUDING METHODS AND SYSTEMS FOR WAVEFRONT SENSING

RIGHTS IN THE INVENTION

This invention was made with government support under Cooperative Agreement AST-1519126, between the National Science Foundation and Associated Universities, Inc., and, accordingly, the United States government has certain rights in this invention.

BACKGROUND

1. Field

The invention is directed toward methods and devices determining the shape of sources of bright light. Specifically, the invention is directed toward methods and devices using non-redundant aperture masking interferometry with and without self-calibration to measure the size and shape of a bright light source. The self-calibration method provides phase calibration solutions for application in sub-nanometer wavefront sensing. A second method uses closure amplitudes to directly determine the size and shape of the light source without requiring self-calibration.

2. Background

High energy particle accelerators are used to generate narrow beams of relativistic electrons and protons for myriad uses, including, but not limited to: (i) high energy particle collision experiments, (ii) medical external beam radiation treatments using LINACS, (iii) Free Electron Lasers, and (iii) as synchrotron light sources. For synchrotron light sources, high energy intense synchrotron photons are emitted by accelerating relativistic electrons in the form of an electron beam to speeds near the speed of light. The electrons are circulated around a synchrotron ring by a series of magnets separated by straight sections. As the electrons are deflected through the magnetic field created by the magnets, they give off electromagnetic radiation, so that at each bending magnet a beam of synchrotron light is produced. This electromagnetic radiation produced by the synchrotron is emitted at a tangent to the electron's orbit and can be used for experiments in material science and related subjects.

A key performance metric for these electron accelerators is the size and shape of the electron beam. Most applications desire electron beams of low emittance (electron vector momentum distribution×electron beam cross sectional area), and high stability, meaning very small and localized electron beams. For a synchrotron light source, lower emittance results in a higher intensity photon beam. In all cases, measuring and monitoring the electron beam shape is fundamental to optimize operations, and potentially for future improved performance and real-time adjustments.

One common method for measuring and monitoring the relativistic electron beam size in synchrotron light sources is through interferometry of the visible synchrotron radiation emitted by accelerating relativistic electrons (Synchrotron Radiation Interferometry or SRI). The SRI method relies on the Fourier transform relationship between the measured interferometric fringe pattern in the interferogram and the synchrotron source intrinsic morphology. A few approaches have been taken for electron beam size and shape measurements using interferometry. One involves a simple two-hole interferometric mask (a 'Young's slit' experiment). The mask can be rotated to obtain the two-dimensional measurement of the coherence for the given baseline (or the separation of holes in the mask). This approach assumes a Gaussian source morphology which then allows a direct estimate of the source size and shape from the coherences. This method has been expanded to a four-hole rectangular mask for an instantaneous two-dimensional measurement. However, a rectangular mask has redundant sampling of the Fourier spacings, which can lead to decoherence of the measurements due to phase instabilities in the laboratory. Non-redundant, multi-hole masks have been used for low flux X-ray beams, but only in one dimension. In all cases, non-uniform illumination across the mask can also be a problem when deriving coherences of the Fourier components and hence beam sizes.

Wavefront sensing is a common practice to measure the distortions of an electromagnetic wavefront as it propagates through an optical system. An electromagnetic wavefront is defined as the plane perpendicular to the direction of propagation of the EM wave, corresponding to the plane of equal phase. Wavefront distortions due to non-ideal optical components, or due to turbulence in the laboratory atmosphere, can lead to 'corrugations' in an initially planar wavefront, corresponding to path-length delays across the wavefront as it transverses the optical system (see FIG. 12). Measuring wavefront distortions, both short timescale (millisecond) and static or long timescale, is a basic technique required in many areas including: (i) adaptive optics, (ii) surface metrology, (iii) medical optometry to measure the shape of the cornea.

SUMMARY

The present invention overcomes the problems and disadvantages associated with current strategies and designs and provides new systems and methods of determining light source characteristics. The self-calibration phase solutions provide sub-nanometer wavefront sensing capabilities for both static and dynamic wavefront distortions.

One embodiment of the invention is directed to a non-invasive method of determining characteristics of a light source. The method comprising the steps of placing a non-redundant aperture mask in a path of light emanating from the light source, capturing an image of the interference pattern on a camera, generating visibilities of the light distribution from the image, and determining the characteristics of the light source based on the visibilities of the light distribution. As the light passes through the non-redundant aperture mask, an interference pattern is created, In a preferred embodiment, the non-redundant aperture mask has at least five apertures. Preferably, each vector baseline separation between apertures in the non-redundant aperture mask is unique. The apertures of the non-redundant aperture mask are preferably arranged in a two-dimensional pattern. Preferably, the step of generating visibilities of the light distribution from the image precedes a self-calibrating process. In a preferred embodiment, the self-calibration process comprises (a) assuming a model of the light source, (b) deriving amplitude and phase corruptions of visibilities associated with each aperture in the non-redundant aperture mask, (c) correcting the derived amplitude and phase corruptions of the visibilities, (d) deriving a new model based on the corrected visibilities, and (e) repeating steps (b)-(d) to converge on the characteristics of the light source.

In a preferred embodiment, the assumed model is a Gaussian model. The correction of the amplitude preferably corrects for the illumination pattern across the non-redundant aperture mask. For a complex source, the assumed model is preferably derived from Fourier imaging and deconvolution using the visibilities. Preferably, the correction of the amplitude corrects for the illumination pattern across the non-redundant aperture mask. Preferably, the correction of the phase acts as a wavefront sensor and provides at least one of a measurement of the pathlength distribution and fluctuations of the light across the non-redundant mask, including a measurement of the tip-tilt of optics, and a measurement of departures from planarity for propagating electromagnetic radiation. Preferably, a number of visibility measurements is greater than a number of free parameters in the source model plus a number of element-based complex gains. Both hole amplitude and phase gains are preferably determined. Preferably, the self-calibration process comprises performing a joint optimization of the Gaussian source size parameters and the hole amplitude gains based on the relationships between measured visibilities, true visibilities, and hole-based amplitude gains. In a preferred embodiment, a model of a complex source is derived from Fourier imaging, self-calibration, and deconvolution using the self-calibrated visibilities.

The light source is preferably a visible light source. Preferably, the light source is one of a beam of relativistic electrons, a celestial object, a high energy particle accelerator, a medical beam radiation device, a free electron laser, or a laser induced plasma light source. In a preferred embodiment, the characteristics are at least one of size and shape of the light source. The method preferably further comprises positioning at least one of a lens, a magnifier, a polarizer, and a monochromatic filter between the light source and the camera. Preferably, the method further comprises deriving closure amplitudes from the visibilities, wherein the visibilities are uncalibrated, and fitting a parametrized source brightness model to directly estimate the source size and shape parameters from the closure amplitudes without requiring self-calibration In a preferred embodiment, the visibilities are calculated based on Fourier transforms. The apertures of the non-redundant aperture mask are preferably identical. Preferably the method further comprises centering the interference pattern on a peak intensity of the image derived after smoothing the image with a Gaussian kernel. Preferably the method further comprises determining hole phase gain solutions, and providing a wavefront sensor for electromagnetic pathlength differences across the mask.

Another embedment of the invention is directed to a system for non-invasively determining characteristics of a light source. The system comprises a non-redundant aperture mask adapted to be placed in a path of light emanating from the light source, a camera adapted to capture an image of an interference pattern created by the light passing through the non-redundant aperture mask, and a processor coupled to the camera. The processor generates visibilities of the light distribution from the image, and determines the characteristics of the light source based on the visibilities of the light distribution.

Preferably, the non-redundant aperture mask has at least five apertures. In a preferred embodiment each vector baseline separation between apertures in the non-redundant aperture mask is unique. The apertures of the non-redundant aperture mask are preferably arranged in a two-dimensional pattern. Preferably, the step of generating visibilities of the light distribution from the image precedes a self-calibrating process.

For the self-calibration process, the processor assumes a model of the light source, derives amplitude and phase corruptions of visibilities associated with each aperture in the non-redundant aperture mask, corrects the derived amplitude and phase corruptions of the visibilities, derives a new model based on the corrected visibilities, and repeats the steps to converge on the characteristics of the light source. The assumed model is preferably a Gaussian model. Preferably, the correction of the amplitude corrects the illumination pattern across non-redundant aperture mask. Preferably, for a complex source, the assumed model is derived from Fourier imaging, self-calibration and deconvolution or the visibilities.

In a preferred embodiment, the correction of the phase acts as a wavefront sensor and provides at least one of a measurement of the pathlength distribution and fluctuations of the light across the mask, including a measurement of the tip-tilt of optics, and a measurement of departures from planarity for propagating electromagnetic radiation. Preferably, a number of visibility measurements is greater than a number of free parameters in the source model plus a number of element-based complex gains. The processor preferably further determines both hole amplitude and phase gains. For the self-calibration process, the processor preferably further performs a joint optimization of the Gaussian source size parameters and the hole amplitude gains based on the relationships between measured visibilities, true visibilities, and hole-based amplitude gains. The light source is preferably a visible light source. The light source is preferable one of a beam of relativistic electrons, a celestial object, a high energy particle accelerator, a medical beam radiation device, a free electron laser, or a laser induced plasma light source. Preferably, the system derives closure amplitudes from the visibilities, wherein the visibilities are uncalibrated, and fits a parametrized source brightness model to directly estimate the source size and shape parameters from the closure amplitudes without requiring self-calibration.

Preferably, the characteristics are at least one of size, shape, and position of the light source. In the preferred embodiment, the system preferably further comprises at least one of a lens, a magnifier, a polarizer, and a monochromatic filter positioned between the light source and the camera. Preferably, the visibilities are calculated based on Fourier transforms. The apertures of the non-redundant aperture mask are preferably identical. In a preferred embodiment, the processor further centers the interference pattern on a peak intensity of the image derived after smoothing the image with a Gaussian kernel. Preferably, the processor determines hole phase gain solutions and provides a wavefront sensor for electromagnetic path-length differences across the mask.

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawings, in which.

DETAILED DESCRIPTION

Figure 1:
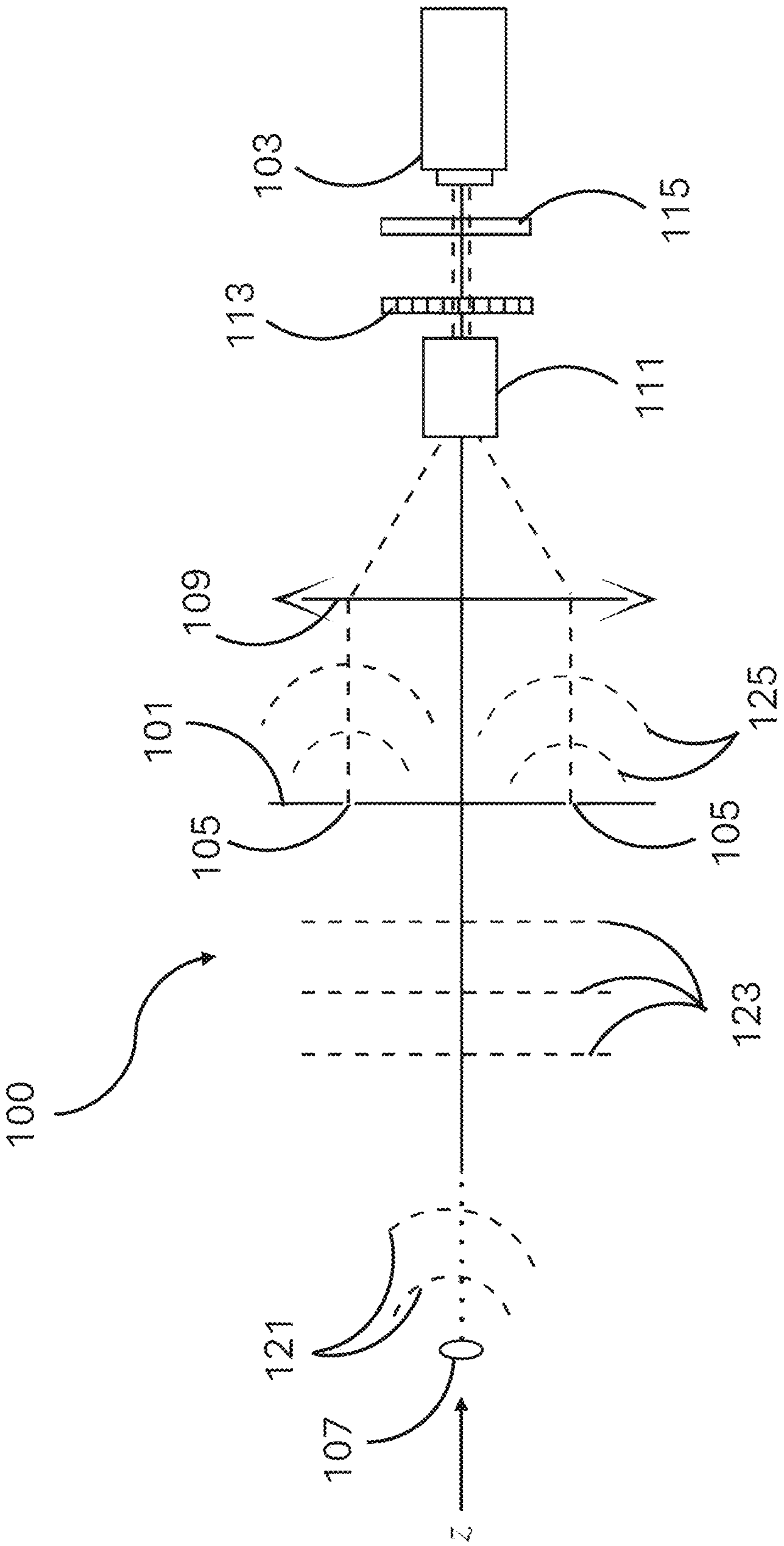
FIG. 1 depicts a schematic diagram of the system.

As embodied and broadly described herein, the disclosures herein provide detailed embodiments of the invention. However, the disclosed embodiments are merely exemplary of the invention that can be embodied in various and alternative forms. Therefore, there is no intent that specific structural and functional details should be limiting, but rather the intention is that they provide a basis for the claims and as a representative basis for teaching one skilled in the art to variously employ the present invention.

Disclosed herein is an advance in SRI in which a 2D, non-redundant mask is employed to obtain an instantaneous measurement of a 2D Gaussian beam shape. The non-redundant mask provides robustness to phase decoherence in redundantly sampled visibilities. The method includes correction of the amplitude and phase corruptions associated with each hole in the mask in the system through an iterative self-calibration process. The amplitude self-calibration solutions correct for the illumination pattern (or amount of light passing through each hole) across the mask, while the self-calibration solutions for the phases for each hole act as a 'wavefront sensor', providing a precise measure of the path-length distribution and fluctuations of the light through the system. The phases are the corrugation of the wavefront that leads to blurring of the image, even if the illumination were uniform. For instantaneous measurement of a 2D Gaussian beam shape of the light source, a second method using interferometric closure amplitudes without the need for amplitude self-calibration, is also disclosed herein.

The invention provides new tools and methods for measuring an accelerator relativistic electron beam size and shape in two dimensions (2D) using Synchrotron Radiation Interferometry (SRI). Measurements are preferably taken non-invasively, or without destroying or interfering with the light source in the measurement process. While described herein with respect to visible wavelengths (i.e., in the wavelength range of about 380 nm to about 750 nm), it is extendable to infrared wavelengths (i.e., in the wavelength range of about 780 nm to about 1000 nm) and to ultra-violate wavelengths (i.e., in the wavelength range of about 100 nm to about 400 nm). The application can be performed in near-real time (milliseconds). Furthermore, while described herein with respect to accelerator relativistic electron beams the methods and systems can be employed in a variety of settings to determine characteristics of a bright light source. For example, the methods and systems can be used for determining characteristics of celestial objects, high energy particle accelerators, medical beam radiation devices, a laser induced plasma light source, or other bright light sources.

Preferably, the system and method use a 2D mask with at least five holes located in the aperture plane of the system. However, fewer holes may be used in some embodiments. The holes are arranged in a 'non-redundant' configuration, in which each vector baseline separation between holes is unique. The non-redundancy avoids decoherence inherent to redundantly sampled interferometer baselines in the presence of phase fluctuations in optical systems. Light passing through the holes of the mask is focused by a lens and through a narrowband filter to select a 'quasi-monochromatic' frequency range, and then onto a CCD camera which generates an interferogram, or image, of the fringe pattern caused by the mask. This interferogram is Fourier transformed to generate visibilities, or Fourier components, of the light distribution, each with an amplitude and phase (or Real and Imaginary parts). These Fourier components are mathematically related to the distribution of the surface brightness of light emitted by the source through the van Cittert-Zernike theorem of interferometry, and hence provide a direct measure of the source size and shape in 2D.

A self-calibration process is then applied, in which a starting model for the source is assumed, and the amplitude and phase corruptions of the visibilities due to the system (i.e. not relating to source structure) are derived. These corruptions are mathematically separable into phase and amplitude contributions arising in each element (i.e. hole in the mask) in the interferometer, and hence are known as "element-based gains".

The visibilities are then corrected, and a new model for the source can be derived from the corrected visibilities. The process can be iterated to converge on a more accurate source surface brightness distribution. In embodiments where the source is known to be Gaussian in shape, a Gaussian source model is assumed, and Gaussian source parameters are then derived. However, the application is generalizable to more complex source structures provided more Fourier components are measured (i.e. there are more holes in the non-redundant mask). The method can be generalized to bright light sources in other contexts. The hole-based amplitude gain solutions from the self-calibration provide a measure of the illumination pattern across the mask.

The hole-based phase gain solutions provide a measure of the path-length for the light travel paths across the visual light system. The path-length can be affected by vibration in the optics, turbulence in the laboratory atmosphere, and/or other phenomena. The hole-base phase gains can act as a wavefront sensor, determining the tip-tilt of the optics, and departures from planarity for the propagating electromagnetic radiation, both static and varying. The accuracy of the wavefront measurements is preferably at the level of a small fraction of a wavelength, with preferably sub-nanometer precision. Both static and dynamic wavefront distortions can be measured.

As an independent alternative to using self-calibration described above to correct the visibilities, closure amplitudes calculated from the uncorrected visibilities without requiring self-calibration, can be employed instead to directly determine the source brightness distribution that can be described by a 2D Gaussian or another parametrization. Closure amplitudes are special interferometric quantities that are constructed using visibilities on a closed loop of an even number array elements, the minimum of which is four. By mathematical construction, the closure amplitudes are independent of the hole- or element-based amplitude gains (the illumination pattern across the aperture) and contain true morphological information about the source brightness distribution, thereby circumventing the need for a calibration of the illumination pattern of the aperture. Although closure amplitudes can be directly used to determine the source brightness shape, they cannot provide the phase distribution across the aperture that is required for wavefront sensing.

Interferometry

Interferometry is a widely employed imaging technique that provides high spatial resolution through cross correlation of electromagnetic signals from an array of interferometric elements.

An interferometer measures the time-averaged, cross correlation of the electric field voltages from pairs of array elements, or mask holes, designated as 'visibilities', $V_{ab}(\lambda)$, where $\lambda$ is the wavelength of the radiation, and $x_a$, a=1, 2, . . . , N denotes the positions of the N array elements. The number of vector baselines, or separations between array elements, for an N element array=N(N−1)/2.

The van Cittert-Zernike theorem states that these visibilities represent Fourier components of the source brightness distribution, with the projected visibility fringe spacing and orientation (the 'spatial frequency') determined by the projected baseline vector between elements, $$u_{ab} = \frac{x_{ab}}{\lambda} = \frac{(x_b - x_a)}{\lambda}.$$

The visibility relates to the spatial coherence of electric field voltages at each array element, $E_a(\lambda)$, and the source brightness distribution, $I(\hat{s}, \lambda)$, as:

$$V_{ab}(\lambda) = \langle E_a^*(\lambda) E_b(\lambda) \rangle = \int\int_{\Omega}^{Image} \Theta(\hat{s}, \lambda) I(\hat{s}, \lambda)\, e^{-i2\pi u_{ab}\cdot\hat{s}} d\Omega \quad (1)$$

where, the angular brackets indicate time average; $\hat{s}$, denotes a unit vector in the direction of any location in the image; $\Theta(\hat{s}, \lambda)$ denotes the array element power response in the direction $\hat{s}$; and $d\Omega$ denotes the differential solid angle in the image-plane.

The voltages measured by the array elements are inevitably corrupted by complex-valued "gain" factors introduced by the intervening medium as well as the array element response. The corrupted measurements are denoted by $$E_a^m(\lambda) = G_a(\lambda) E_a^T(\lambda),$$

where the superscript m denotes a measured quantity (i.e., corrupted by the medium and the array element response), superscript T denotes the uncorrupted, true source voltage, and $G_a(\lambda)$, known as the 'complex gain', denotes the net corruption factors to the voltage introduced in the measurement process factorizable in such a way that it is attributable to the individual array element. Thus, a calibration process, which determines $G_a(\lambda)$ is required to correct for these gains to recover the true electric fields.

Neglecting measurement noise, the measured visibility, $$V_{ab}^m(\lambda),$$

between two array elements, a and b, then becomes:

$$V_{ab}^m(\lambda) = G_a^*(\lambda)G_b(\lambda)V_{ab}^T(\lambda) = |G_a(\lambda)||G_b(\lambda)||V_{ab}^T(\lambda)|\, e^{i(\theta_a(\lambda)-\theta_b(\lambda)+\phi_{ab}^T(\lambda))} \quad (2)$$

where, $$V_{ab}^T(\lambda)$$

is the true complex-valued visibility (spatial coherence) of the object in the image factorizable into its true amplitude, $$|V_{ab}^T(\lambda)|,$$

and phase, $$\phi_{ab}^T(\lambda).$$

A visibility is the product of two electric fields, and has units of squared voltage, or power. The value $\theta_a(\lambda)$ is the phase in the complex-valued gain, $G_a(\lambda)$, for element a, introduced by the propagation medium and the array element. The value of $|G_a(\lambda)|$ corresponds to the amplitude gain for array element a. The measured visibility phase is given by the visibility argument:

$$\phi_{ab}^m(\lambda) = \phi_{ab}^T(\lambda) + \theta_a(\lambda) - \theta_b(\lambda).$$

Closure Phase:

Closure phase is a measurement of the properties of the source brightness distribution that is invariant to element-based phase corruptions. Closure phase is the sum of three visibility phases measured cyclically on three interferometer baseline vectors forming a closed triad of elements, i.e. any three-element interferometer defined in the mask:

$$\phi_{abc}^m(\lambda) = \phi_{ab}^T(\lambda) + \theta_a(\lambda) - \theta_b(\lambda) + \phi_{bc}^T(\lambda) + \theta_b(\lambda) - \theta_c(\lambda) + \phi_{ca}^T(\lambda) + \theta_c(\lambda) - \theta_a(\lambda) \quad (3)$$

In this summation, the element-based phase errors, $\theta_a(\lambda)$, cancel, and the measured closure phase equals the true closure phase, independent of calibration. Closure phase is image shift invariant, and it relates to the symmetry properties of the source. Closure phase is conserved under element-based complex gain calibration.

Closure Amplitude:

Analogous to closure phase, closure amplitude is a measurement of the properties of the source brightness distribution that is invariant to element-based amplitude corruptions. Closure amplitude is the ratio of visibility amplitudes measured cyclically on four interferometer baseline vectors forming a closed quad of elements, i.e. any four-element interferometer defined in the mask:

$$A_{abcd}^m = \frac{|V_{ab}^m(\lambda)|\,|V_{cd}^m(\lambda)|}{|V_{cb}^m(\lambda)||V_{ad}^m(\lambda)|} = \frac{|G_a(\lambda)||G_b(\lambda)||V_{ab}^T(\lambda)|\,|G_c(\lambda)||G_d(\lambda)||V_{cd}^T(\lambda)|}{|G_c(\lambda)||G_b(\lambda)||V_{cb}^T(\lambda)|\,|G_a(\lambda)||G_d(\lambda)||V_{ad}^T(\lambda)|} = \frac{|V_{ab}^T(\lambda)|\,|V_{cd}^T(\lambda)|}{|V_{cb}^T(\lambda)||V_{ad}^T(\lambda)|} = A_{abcd}^T \quad (4)$$

In this ratio, referred to as closure amplitude, the amplitudes of the element-based gains cancel, and therefore the closure amplitude from the corrupted visibility measurements equal the true closure amplitude from the uncorrupted/true visibilities. Therefore, being preserved under element-based complex gain corruption, closure amplitude is scale-invariant, and it relates to the true morphological nature of the object under study. It allows for determining the parametrized model of a source brightness distribution without requiring the derivation of the illumination pattern affecting the holes in the aperture.

Interferometric Self-Calibration

The process of self-calibration determines the complex gain factors that correspond to the element-based distorting effects in Equation (2). In self-calibration, an initial a priori source brightness model of the target object is used to predict the true visibilities. Equation (2) is then inverted to derive the complex voltage gains $G_a(\lambda)$. The gains are then applied to the measured visibilities, leading to an updated source model using the Fourier relationship (Equation (1)), through either model fitting or a Fourier imaging and deconvolution process. The process is iterated until convergence is achieved.

The amplitudes of the element-based distortion effects, or amplitude gains, correspond to the voltages of the electromagnetic illumination pattern across the mask. Squaring the voltages gives the intensity illumination pattern, or power pattern, across the mask.

The hole-based phase gains correspond to differences in electromagnetic path-length across the mask to the source. These path-length differences can be constant in time due to the set-up of the physical optics of the system or can fluctuate in time due to vibration of the optics or transmission of the electromagnetic radiation through the laboratory atmosphere. The change in path-length, $\delta L$, relates to the hole-based phase gain, $\delta\theta$ (in radians), as:

$$\delta L = (\delta\theta/2\pi) \times \lambda \quad (5)$$

Where, as noted above, $\lambda$ is the wavelength of the radiation. Hence, for short wavelengths of the radiation, measurement of phase gains can be a very precise measurement of wavefront distortions, at the level of fractions of a wavelength.

Example

The method was tested at the ALBA synchrotron visible light source ("the ALBA experiments"). The test set-up included: a light path from the electron beam (described herein as the photon source) to the aperture mask location, reimaging optics to achieve far-field equivalence, narrow band filters centered at 540 nm with a bandwidth of 10 nm, a polarizer, and CCD camera imaging, the CCD camera had 1296×966 pixels. The distance from the mask to the target source, which is used to relate angular size measurements to physical size of the electron beam, was 15.05 m. The optical extraction mirror was located 7 mm above the radiation direction (orbital plane of the electrons), at a distance of 7 m from the electron beam, implying an off-axis angle of 0.057°. FIG. 1 shows a schematic of the system.

FIG. 1 illustrates a schematic of a system 100 according to aspects of the disclosure. System 100 is a system configured to characterize a photon or other bright light source 107. The system comprises a non-redundant, two-dimensional aperture mask 101 and an image sensor 103. The non-redundant, two-dimensional aperture mask 101 comprises a plurality of apertures 105. It will be appreciated that in the schematic the non-redundant, two-dimensional aperture mask 101 is illustrated as a one-dimensional object comprising two apertures 105, though in practice the non-redundant, two-dimensional aperture mask 101 comprises at least three apertures and more preferably at least five apertures, arranged so as to not be in a line (i.e., so as to be two-dimensional). The system 100 is configured such that the non-redundant, two-dimensional aperture mask 101 is positioned between the photon source 107 and the image sensor 103 such that the image sensor can record an image of the interference pattern produced by the non-redundant, two-dimensional aperture mask 101.

The photon source 107 emits light having certain characteristics and wavefronts 121 which, at least in part, depend upon the size and shape of the photon source 107. At a suitable distance from the photon source 107, i.e., in the far-field, the wavefronts 123 can be considered parallel. These parallel wavefronts 123 are incident on the non-redundant, two-dimensional aperture mask 101. When passing through each of the apertures 105, the light undergoes Fraunhofer diffraction to give rise to curved wavefronts 125, which interfere with each other to create the interference pattern that is recorded by the image sensor 103.

As shown in FIG. 1, additional optical components may also be included to aid in the recording of the interference pattern. As illustrated, system 100 may have a lens 109 and/or a magnifier 111 positioned between the non-redundant, two-dimensional aperture mask 101 and the image sensor 103 to focus and/or magnify the image of the interference pattern produced by the non-redundant, two-dimensional aperture mask 101. A polarizing filter 113 and/or a monochromatic filter 115 may also be provided to improve the quality of the imaged interference pattern. The polarizing filter 113 and the monochromatic filter 115 are shown between the magnifier 111 and the image sensor 103, but it will be appreciated that they can be positioned at any point in the system between the photon source 107 and the image sensor 103, and in any order relative to one another. However, placing them after lens 109 and magnifier 111 allows for smaller components to be used, as the light path at this point in system 100 will be narrower.

Figure 2A:
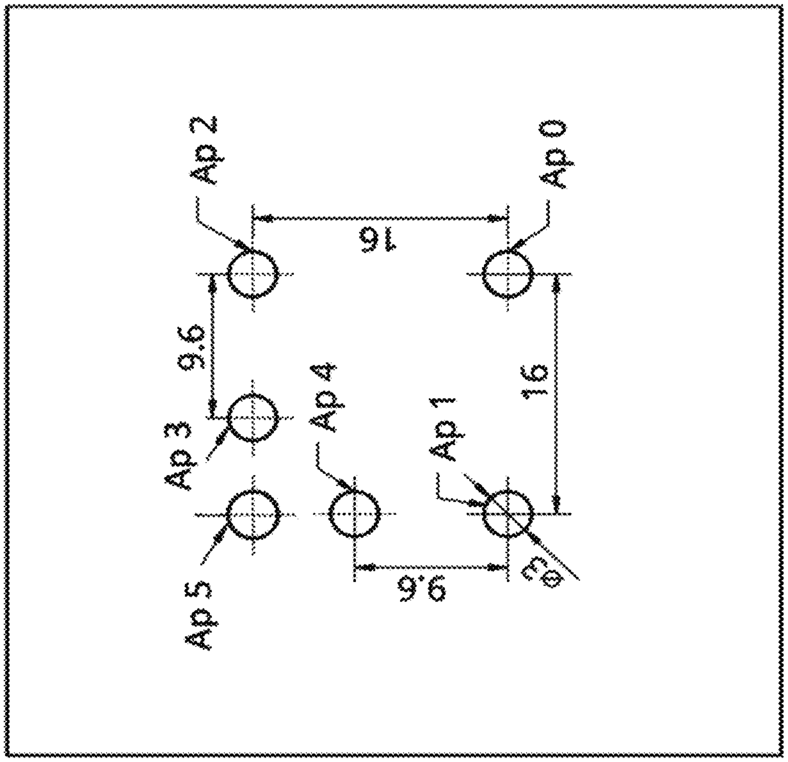
FIG. 2A depicts scale drawing of a 6-hole mask with aperture labels for labelling baselines. Dimensions are in mm.

FIG. 2A shows a schematic of one embodiment of the 2D mask with six holes. FIG. 2A shows the positions of the apertures 105 of an exemplary six-aperture, non-redundant, two-dimensional aperture mask 101, with the apertures 105 labelled Ap 0, Ap 1, Ap 2, Ap 3, Ap 4, and Ap 5. As can be seen in FIG. 2A, the apertures Ap 0-5 are not arranged linearly-they are arranged in a two-dimensional plane. This enables a two-dimensional characterization of the photon source using the interference pattern generated by the aperture mask 101.

The arrangement of apertures Ap 0-5 is also non-redundant. The vector between each combination of two apertures, Ap 0-5, is unique. That is, no combination of two apertures, Ap 0-5, is separated by the same vector as any other combination of two apertures, Ap 0-5. While some vectors between apertures Ap 0-5 may be in the same direction, such as the vector Ap 0 to Ap 1 and the vector Ap 2 to Ap 3, and while some vectors between apertures Ap 0-5 may be of the same magnitude (as labeled), such as the vector Ap 0 to Ap 1 and the vector Ap 0 to Ap 2, no two vectors have both the same direction and the same magnitude.

As can also be seen in FIG. 2A, apertures Ap 0-5 are all identical. In this case, apertures Ap 0-5 are all circular with the same radius. Generally, apertures 105 do not need to be identical shapes and sizes, but this can aid in designing, manufacturing, and implementing the method. For example, using identical circular apertures 105, can enable the interference pattern to be centered based on the Airy ring pattern formed in the resulting interference pattern, which can improve the accuracy of the method.

Figure 3:
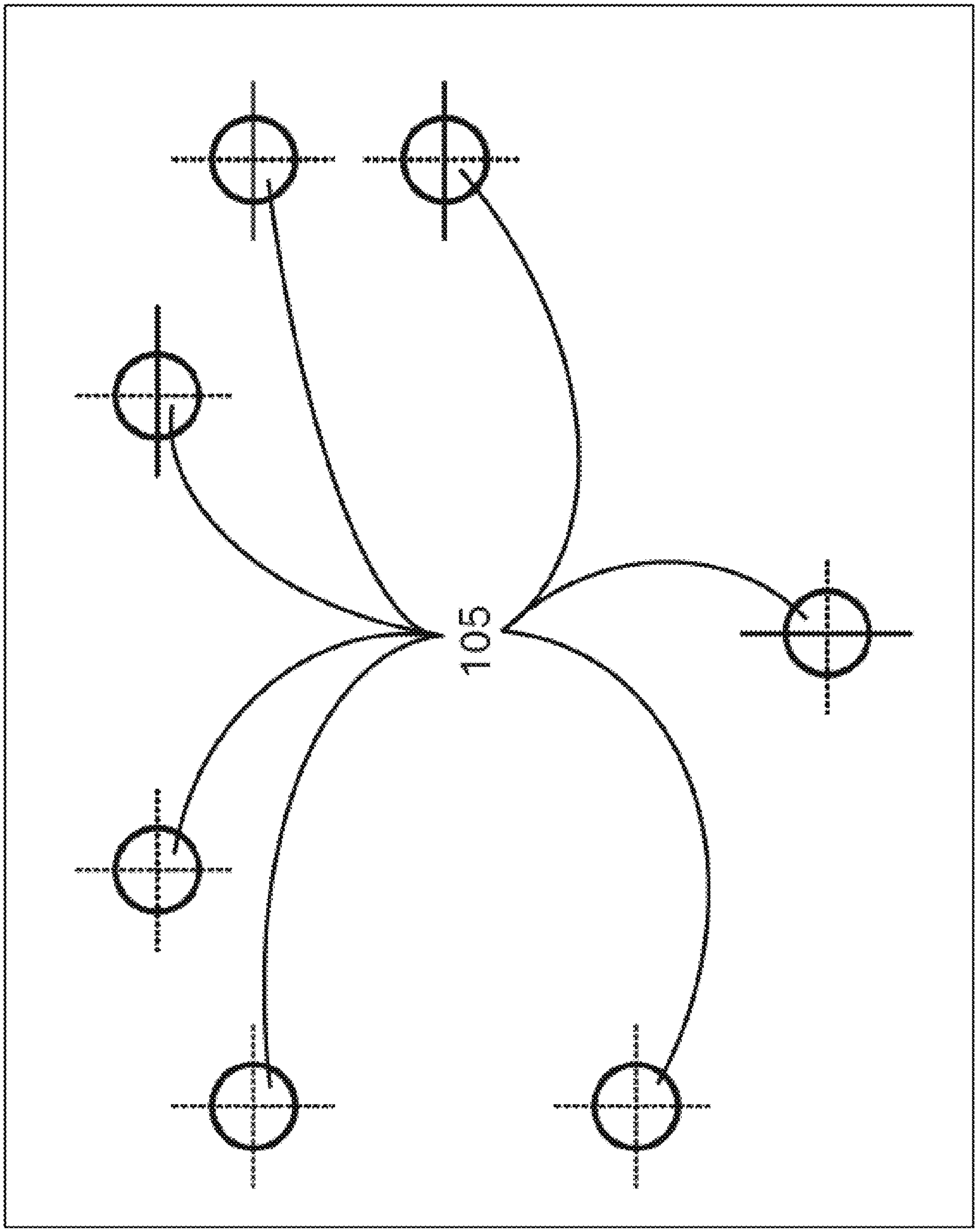
FIG. 3 depicts a third embodiment of a receiver testing device with additional optional components.

FIG. 3 illustrates another embodiment of a layout of apertures 105, with a seven-aperture, non-redundant, two-dimensional aperture mask 101. As with the six-aperture, non-redundant, two-dimensional aperture layout of FIG. 2A, the seven apertures 105 in FIG. 3 are arranged over a two-dimensional space such that vector between each combination of two apertures is unique.

In the ALBA experiments, the target source size was ≤60 μm, which, at a distance of 15.05 m, implies an angular size of ≤0.84". For comparison, the angular interferometric fringe spacing of the longest baseline in the mask of 22.6 mm at 540 nm wavelength is 5". This maximum baseline in the mask is set by the illumination pattern on the mask (FIG. 2A). Hence, the source is only marginally resolved, even on the longer baselines. However, the signal to noise is extremely high, with millions of photons in each measurement, thereby allowing size measurements on partially resolving baselines.

Figure 9:
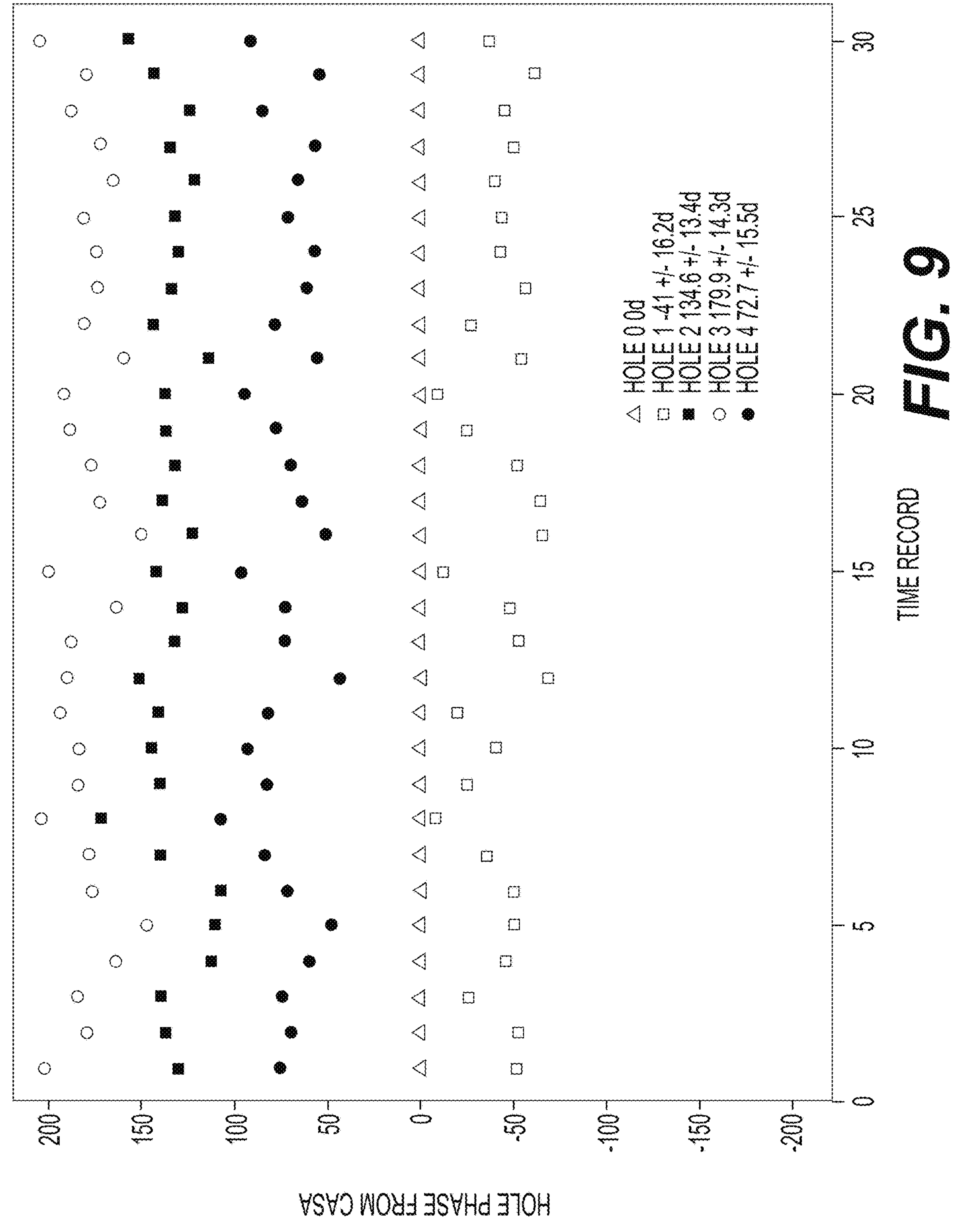
FIG. 9 depicts hole-based phase gain terms for five holes for the time series from CASA complex self-calibration, with hole 0 as the reference.

The primary results on determining source size are based on the 5-hole, non-redundant mask in which hole Ap 5 is closed, as shown in FIG. 9. The ALBA experiments used masks with 2, 3, 5, 6, and 7 holes to investigate various physical phenomena. The 2-hole experiment employed a 16 mm hole separation, and the mask was rotated by 45° and 90° sequentially to obtain two-dimensional information. The 2-hole results were employed as a check on the 5-hole results.

Image Processing

Figure 2B:
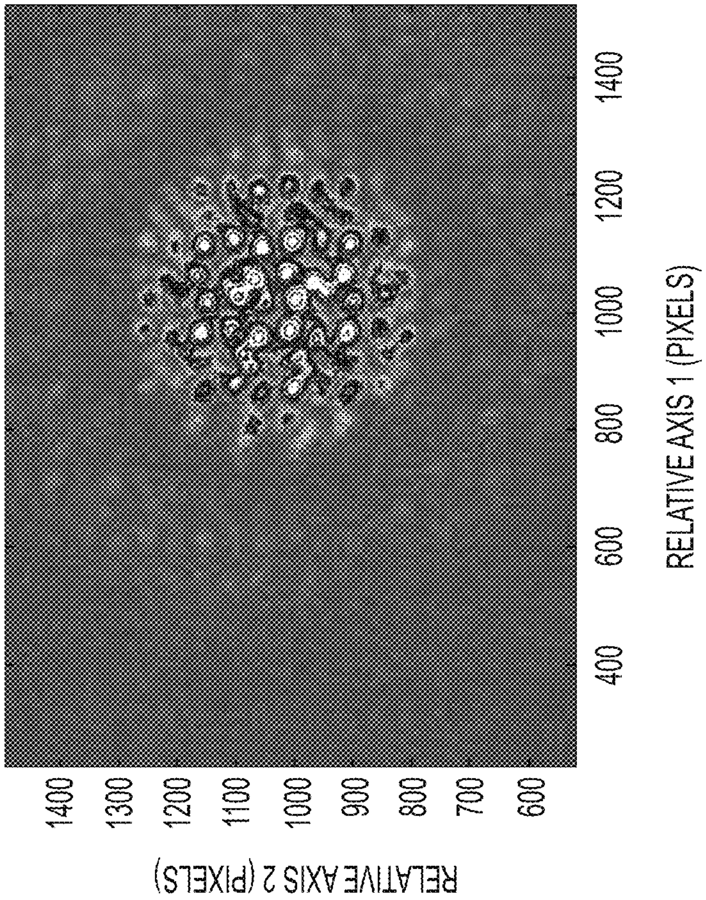
FIG. 2B depicts an interferogram for a 5-hole mask (i.e., with hole Ap5 in FIG. 2A covered) with 3 mm-diameter holes and 1 ms integration time. Contours are a geometric progression in factors of two, starting at 25 counts per pixel.

CCD frames of 1 ms duration were taken every 1 second. Each mask experiment included 30 exposures. FIG. 2B also shows an example of a 5-hole image interferogram. The steps in the image processing included:

Use of a 5-hole mask with 3 mm diameter holes. Larger hole diameter and longer integration time were explored and considered less optimal. Masks with 2, 5, 6, and 7 holes were employed in testing, with holes as small as 2 mm. Measurements were made at 400 nm and 540 nm wavelength.

A background offset surface brightness was determined. The offset surface brightness is due to a combination of the CCD read bias and dark current. A fixed estimate of this offset of 3.7 counts per pixel, obtained by examination of the darkest areas of the CCD image and the FFT of the image, was used.

The image was padded and centered so that the center of the Airy disk-like envelope of the fringes was in the center of a larger two-dimensional array of size 2048×2048. To find the correct pixel to center to first, the image was smoothed with a wide (50 pixel) Gaussian kernel, then the pixel with highest signal value was selected. The Gaussian filtering smooths the fringes creating an image corresponding approximately to the Airy disk. Without the filtering the peak pixel selected would be affected by the fringe position and the photon noise, rather than the envelope. Off-sets of the Airy disk from the image center lead to phase slopes across the visibility u,v-measurement regions.

Fourier Analysis

Figure 4B:
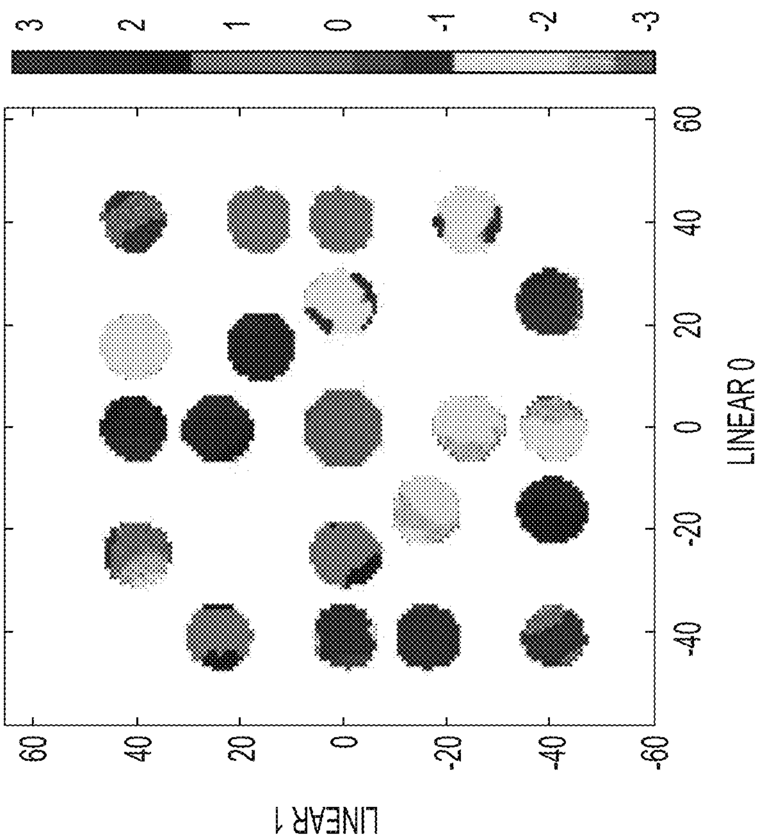
FIGS. 4A-B depict amplitude and phase of the FFT of the example 5-hole interferogram. Contours are a geometric progression in factor two. Labels identify peaks of amplitude with the corresponding pair of apertures forming the baseline of the visibility that the peak represents (FIG. 2A). Phase units are radians. Visibility amplitudes and phases are measured for the 10 visibilities by averaging over the visibility regions using a 7 uv-pixel radius on the real and imaginary Fourier images.
Figure 4A:
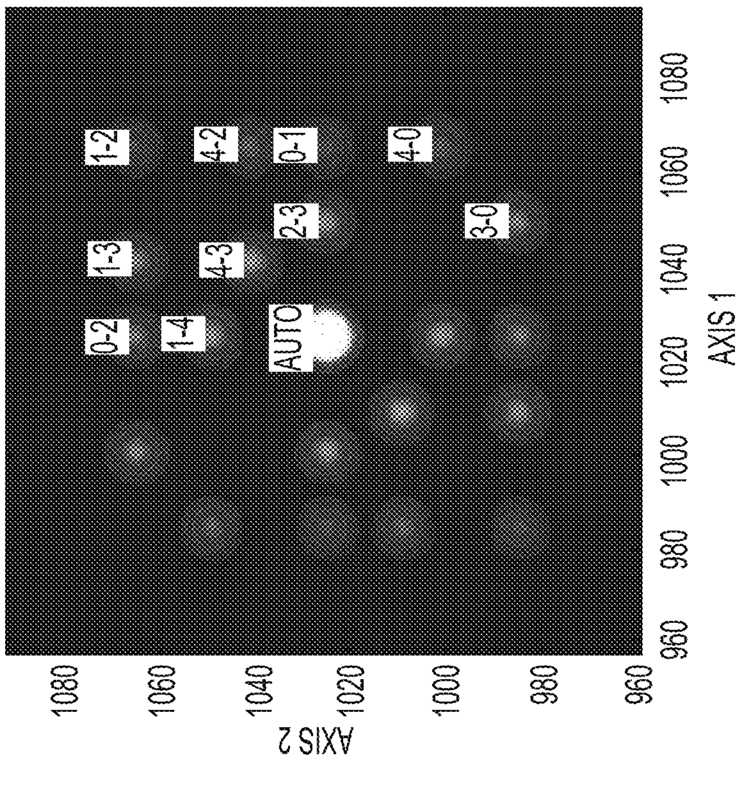

To calculate the coherent power on each baseline between pairs of holes, the van Cittert-Zernike theorem that the visibility coherence on a given vector baseline is related to the source intensity distribution by a Fourier transform is used. Therefore, the two-dimensional Fourier transform of the padded CCD frame using the FFT (Fast Fourier Transform) algorithm is computed. Amplitude and phase images of an example Fourier transform are shown in FIGS. 4A-B, respectively. Distinct peaks can be seen in the FFT corresponding to each vector baseline defined by the aperture separations in the mask.

The correlated power on each of the baselines are extracted by calculating the complex sum of uv-pixel values (Real and Imaginary), in the images produced by the Fourier transform of the interferogram within a circular uv-aperture of 7-pixel radius, centered at the calculated position of the 10 vector uv-baselines, as annotated in FIGS. 4A-B. The resulting values of amplitude and phase represent the complex visibility measurements for the sampled vector baselines of the mask.

Self-Calibration and Source Size Analysis

Hole gain self-calibration and source size analysis proceeds using the measured data set of visibilities. Given the small number of visibility measurements (10), reconstruction of a complex source light distribution is not possible due to the limited number of measured visibilities. However, in the current application, it is well documented that relativistic electron beam synchrotron light sources have a Gaussian 2D profile to high accuracy. Hence, adopting a model of a Gaussian source and constraining the Gaussian parameters with the 10 visibilities leads to high accuracy based on the Fourier transform relation between visibilities and source brightness distribution shown in Equation (1). Note that more complex source morphologies can be determined by employing non-redundant masks with more holes, and hence more independent measurements of Fourier components of the light distribution.

Figure 5A:
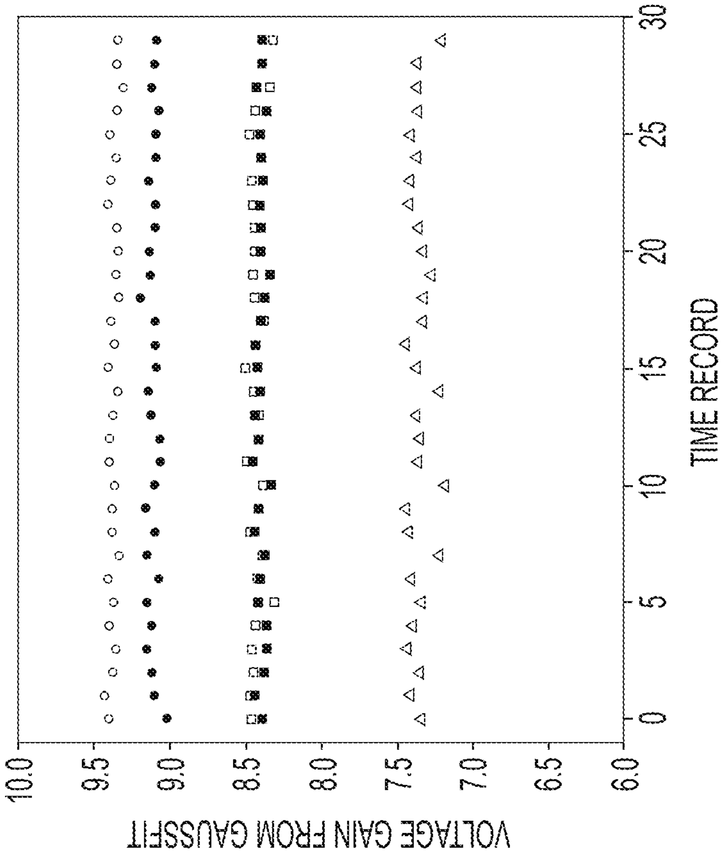
FIG. 5A depicts hole-based voltage gains (mask illumination pattern), from a joint Gaussian fitting and amplitude gain self-calibration process for the time series of measurements for the 5-hole mask. The gains are stable to better than 1% RMS, and amplitude gains vary between holes by up to 25%, thereby requiring self-calibration to correct the visibilities back to true coherences.
Figure 5B:
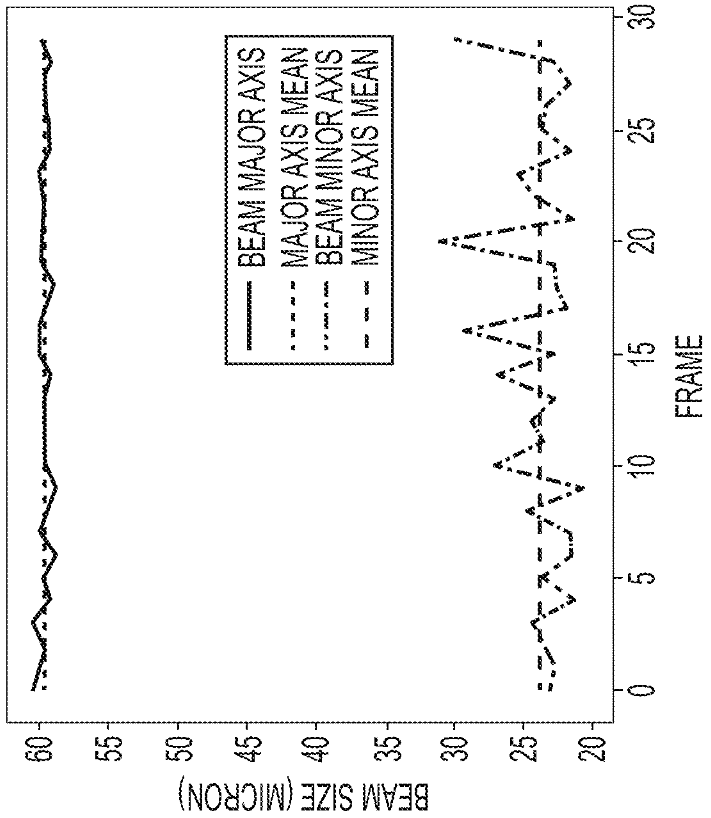
FIG. 5B depicts the source size parameters for major and minor axis dispersion for the time series.
Figure 5C:
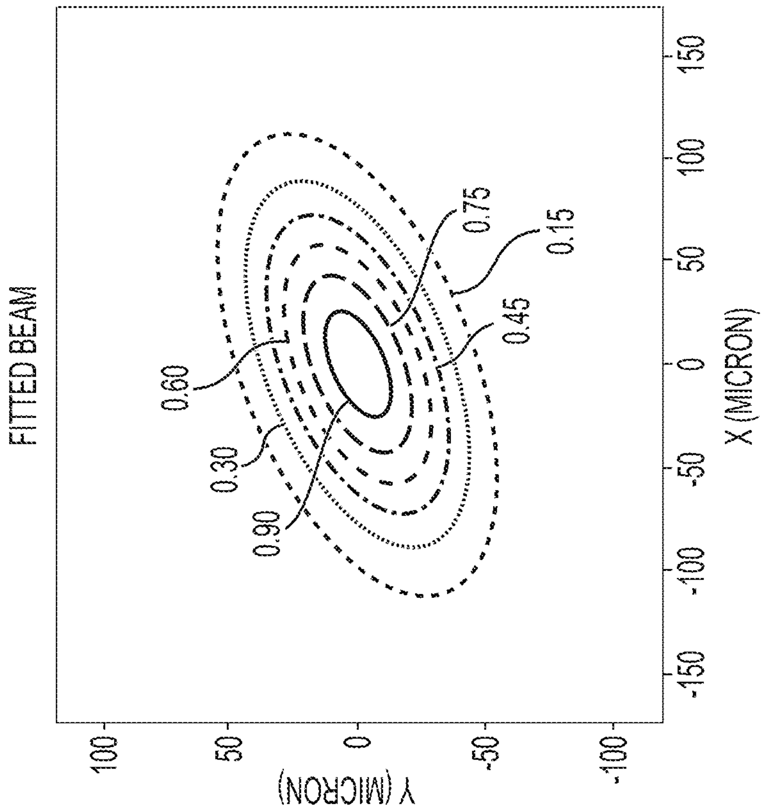
FIG. 5C depicts the resulting image of the Gaussian relativistic electron beam synchrotron light source.

Two embodiments for self-calibration of the hole-gains and determination of the source size are discussed herein. The first method employs the visibility amplitudes, and performs a joint optimization of the Gaussian source size parameters and the hole amplitude gains, |G_a(λ)| (i.e. the voltage illumination pattern over the mask), based on the relationships between measured visibilities, true visibilities, and hole-based amplitude gains dictated by Equations (1) and (2). The fitting to the data is done using the Levenberg-Marquardt algorithm. FIGS. 5A-C show the results for the hole amplitude voltage gains. High stability is found for the results, to a root mean square (RMS) variation of better than 1%. The hole-based amplitudes also differ by up to 25%, implying that correcting for the voltage gains is necessary to avoid errors in the corrected visibilities of similar magnitude (or greater, since the corrected visibilities include the product of gains, as in Equation (2)).

FIGS. 5A-C also show the time series derived for the source Gaussian parameters, and the final image of the Gaussian source distribution, as the mean of the results over the time series. The image shown in FIG. 5C is one embodiment of the systems' and methods' output. A comparison of the source parameters derived from this analysis, to parameters derived using other methods is listed in Table 1. The 2D non-redundant, 5-hole mask method with self-calibration results agree, to within a few percent, with other methods.

TABLE 1

| Method | Major (μm) | Minor (μm) | Tilt Angle |
|---|---|---|---|
| 2ap (3 ms) | 61.7 ± 1.5 | 25.5 ± 1.5 | 16.6° |
| 5ap (1 ms) | 59.6 ± 0.1 | 23.8 ± 0.5 | 15.9° ± 0.2° |
| LOCO | 57.5 | 20.6 | 14.9° |
| Pinhole | 58.5 | 24.6 | 14.9° |

The second method assumes a Gaussian model for the source based on a priori source information (e.g. X-ray pin hole measurements) and employs self-calibration of hole-based complex gains for both amplitudes and phases. The process uses the model source visibilities and the measured source visibilities to derive the complex gains using Equation (2). In this instance, the self-calibration process employs interferometric visibility data analysis tools, for example, available in CASA software. The measured visibilities can then be corrected by the complex gains, and a new source model can be estimated from the corrected visibilities using Equation (1), using either model fitting to the corrected visibilities, or a Fourier imaging and deconvolution process. The self-calibration process can then be iterated with the new model to obtain better gain corrections and hence better visibilities and source parameters.

Figure 6A:
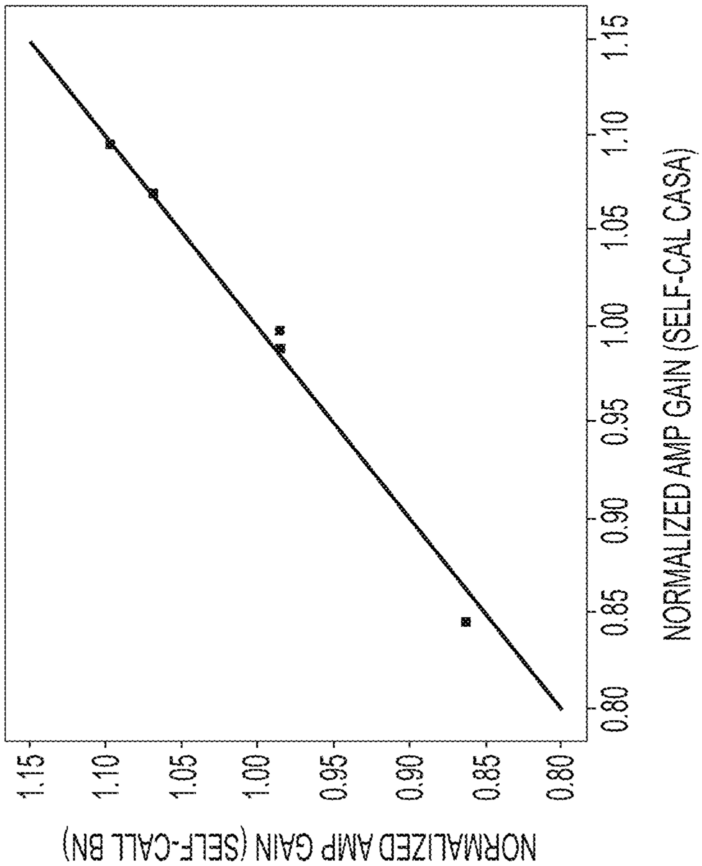
FIGS. 6A-B depict a comparison of hole-based amplitude gains between two self-calibration methods, and between corrected amplitudes for the 10 visibilities for the 5-hole mask. Agreement is good to better than 1%.
Figure 6B:
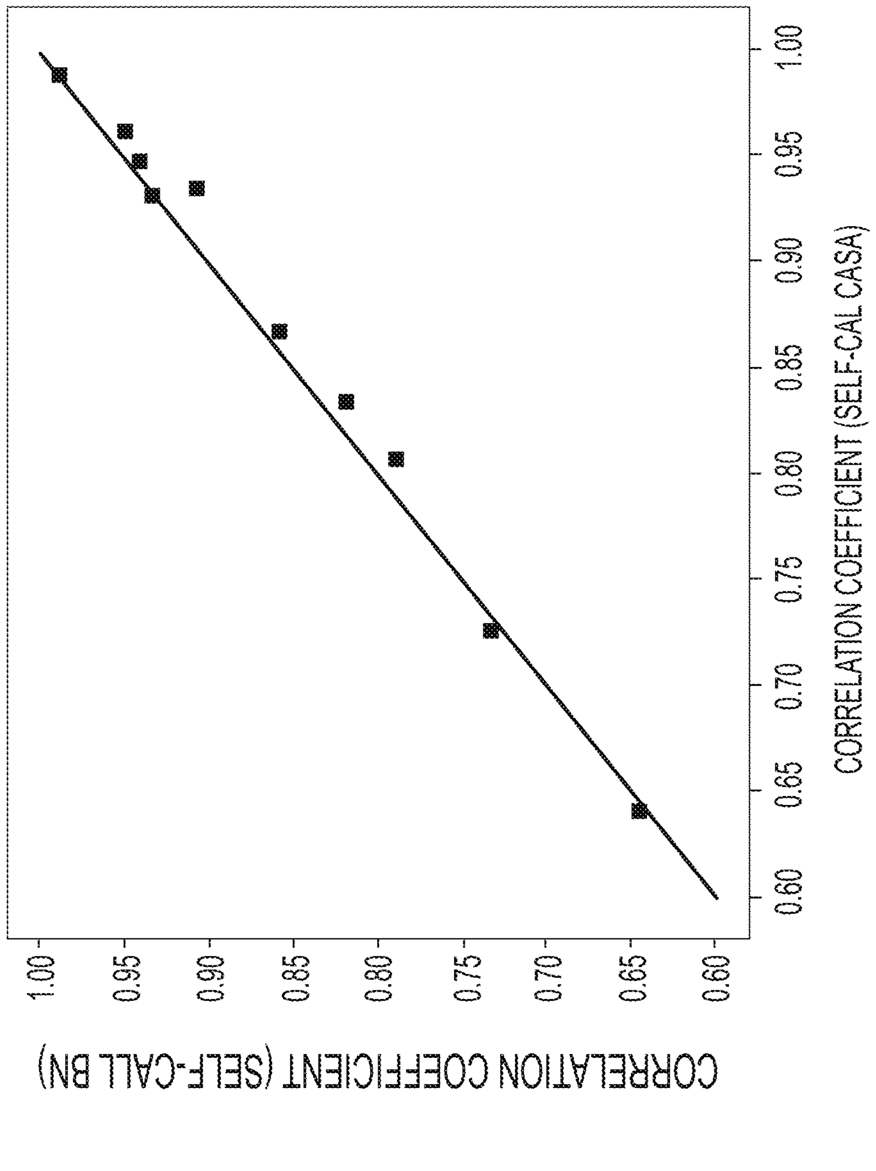

FIGS. 6A-B show a comparison of the amplitude gains derived from the first method compared to the second method, as well as a comparison of the corrected visibilities. Consistency between methods is preferably 1% or better.

The first method, employing only hole gain amplitudes, $|G_a(\lambda)|$, provides an accurate source size measurement, and $|G_a(\lambda)|$ values (mask illumination pattern), and is effective in the case of a single Gaussian source model employing a small number of visibility measurements (e.g. 10 in the case of a 5-hole mask). This method can be implemented on millisecond timescales.

The second method, compared to the first method, provides consistent values of $|G_a(\lambda)|$ and corrected visibilities, and hence leads to the same source size. However, for a small number of visibility measurements (10, in this case), a good starting source model is required to reach convergence in the second method. Increasing the number of holes in the non-redundant mask, and hence the number of independent Fourier component measurements or visibilities, decreases the demands on the quality of the starting model.

For more complex source morphologies, a well sampled non-redundant mask with many visibility measurements should allow for an iterative imaging and self-calibration process that converges to the true source distribution. Such an imaging/self-calibration process requires that the number of visibility measurements be greater than the number of free parameters in the source model.

Direct Source Size Analysis Using Closure Amplitudes without Self-Calibration

An embodiment of direct determination of the source size without requiring self-calibration of the hole-gains is discussed herein. Noting that closure amplitudes are invariant to whether uncalibrated or calibrated visibilities are used, it is not necessary to invoke hole amplitude gains, $|G_a(\lambda)|$ (i.e. the voltage illumination pattern over the mask), and only requires uncorrected visibility amplitudes as follows.

At any instant, there are N(N−1)/2 unique visibility measurements (excluding auto-correlation) from the Fourier transform of an interferogram of a N-element non-redundant array. From such an array, the total number of 4-element loops possible is $O(N^4)$. However, the number of complete and independent closure amplitude measurements is only N(N−3)/2. Closure measurements on other closed loop combinations are not independent and can be derived from the complete and independent set. If the number of parameters to describe the source brightness distribution shape is $N_p$, then these parameters can be determined by an optimization process if $N_p \leq N(N-3)/2$.

If the source distribution is assumed to be a 2D Gaussian as is typical in relativistic electron beam synchrotron light sources, the 2D Gaussian shape can be described by an elliptical cross-section with $N_p=3$ parameters (semi-major axis, semi-minor axis, and tilt angle the major axis makes with the x-axis). Hence, with N=5 holes, the number of independent closure amplitude measurements is N(N−3)/2=5. Thus, the 2D Gaussian shape can be determined directly. Specifically, for a 2D Gaussian source brightness shape, the coherence function between the holes in the aperture plane is also a 2D Gaussian, and its shape parameters can be determined analytically. In such a scenario, the optimization problem can be performed using even an analytical framework by taking logarithm of the closure amplitudes which will result in a simple system of equations linear in the source brightness shape parameters that are to be determined.

By applying the closure amplitudes method on the uncalibrated visibilities, the estimates for the Gaussian shape parameters from the optimization process are:

$$\text{semi-major axis} = 59.93 \pm 0.07\ \mu\text{m},$$

$$\textit{semi}\text{-minor axis} = 23.19^{+0.50}_{-0.52}\ \mu\text{m, and}$$

$$\text{beam tilt} = 15.2^\circ \pm 0.16^\circ.$$

Notably, these results agree to within a few percent of the results from the self-calibration and source analysis method (Table 1). The main difference is that the source brightness shape parameters were directly determined without requiring to determine the hole illuminations, $G_a(\lambda)$, regardless of what they were.

Although closure amplitudes can directly solve for the source brightness distribution even if the latter varies with time, an additional computational advantage is gained from this method when the true source brightness distribution does not vary with time. In such cases, closure amplitudes can be accumulated over sufficiently long intervals of time (over which source brightness distribution stays constant) thereby achieving a high level of data compression, allowing for solution of the source brightness parameters at a much reduced cadence.

Phase Analysis and Wavefront Sensing

Figure 12:
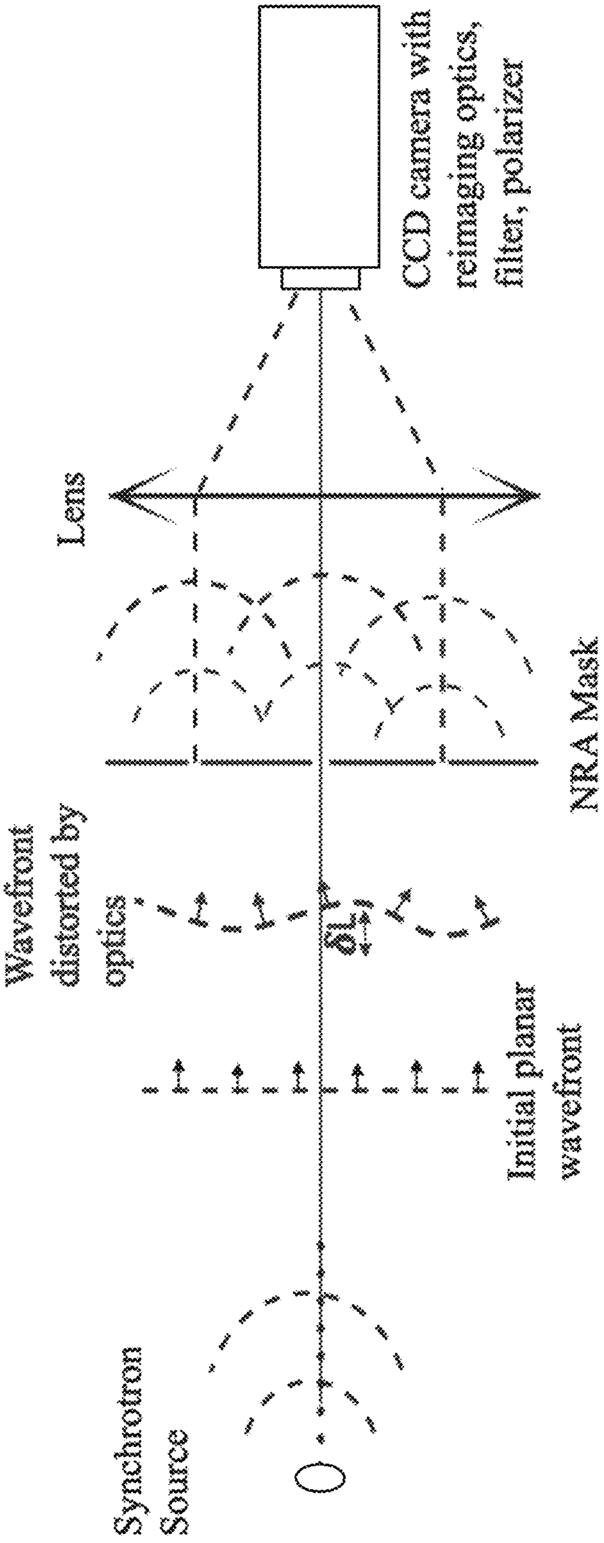
FIG. 12 depicts a schematic diagram of the optical system used for synchrotron radiation interferometry. Not shown are the 8 flat mirrors between the source and the mask. The center curve shows an idealization of a distorted wavefront after propagation through the optical system due to non-perfect optics and/or laboratory turbulence.
Figure 13:
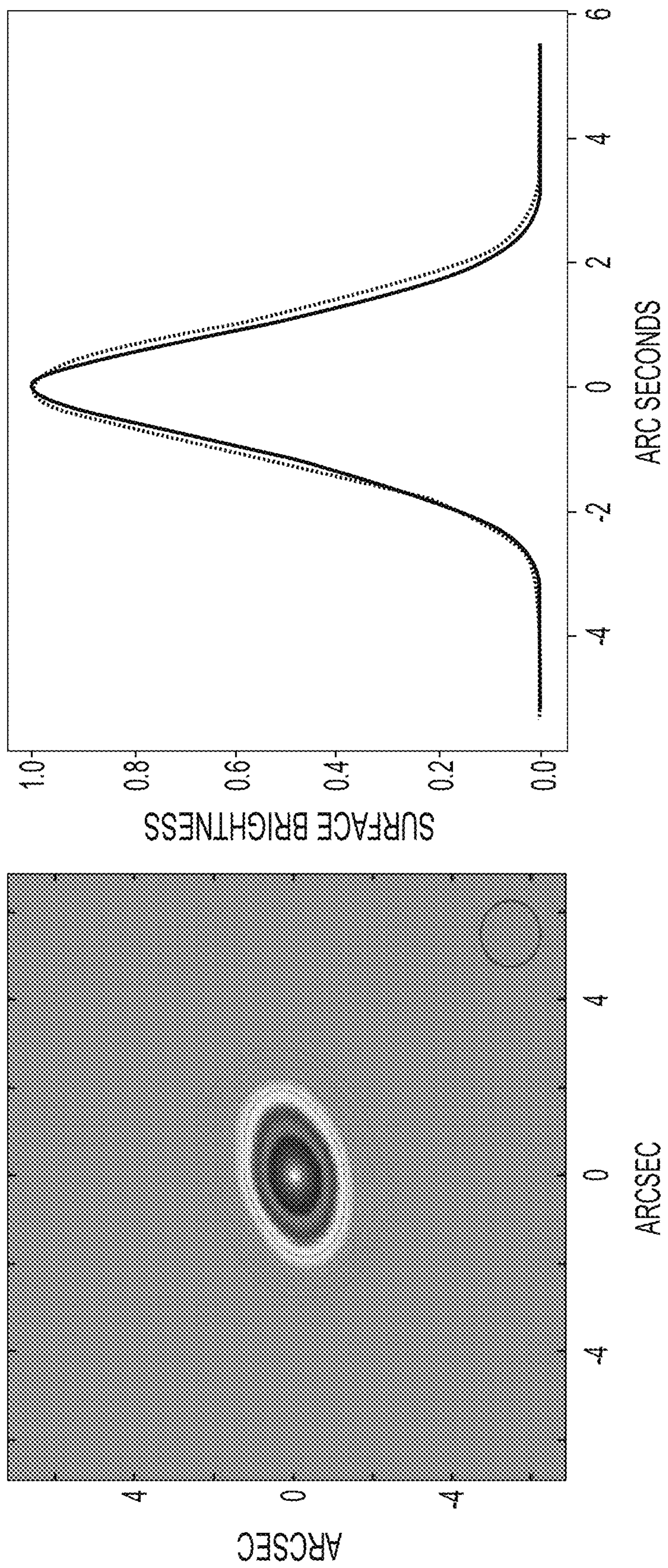
FIG. 13 depicts, on the left side, a synchrotron source image using a Fourier transform of the self-calibrated visibilities and a deconvolution process that that corrects for the point response function of the aperture mask without assuming a Gaussian model, for a 7-hole mask at 400 nm wavelength. Contour levels are a geometric progression in factor 2 starting at 1% of the peak. The right side depicts a major axis profile derived from the deconvolved image (solid) plus the expected profile (dotted; the deconvolved image and both curves have been convolved with a FWHM=1.5" Gaussian). The deconvolution process recovers accurately both the major axis size and position angle.
Figure 14:
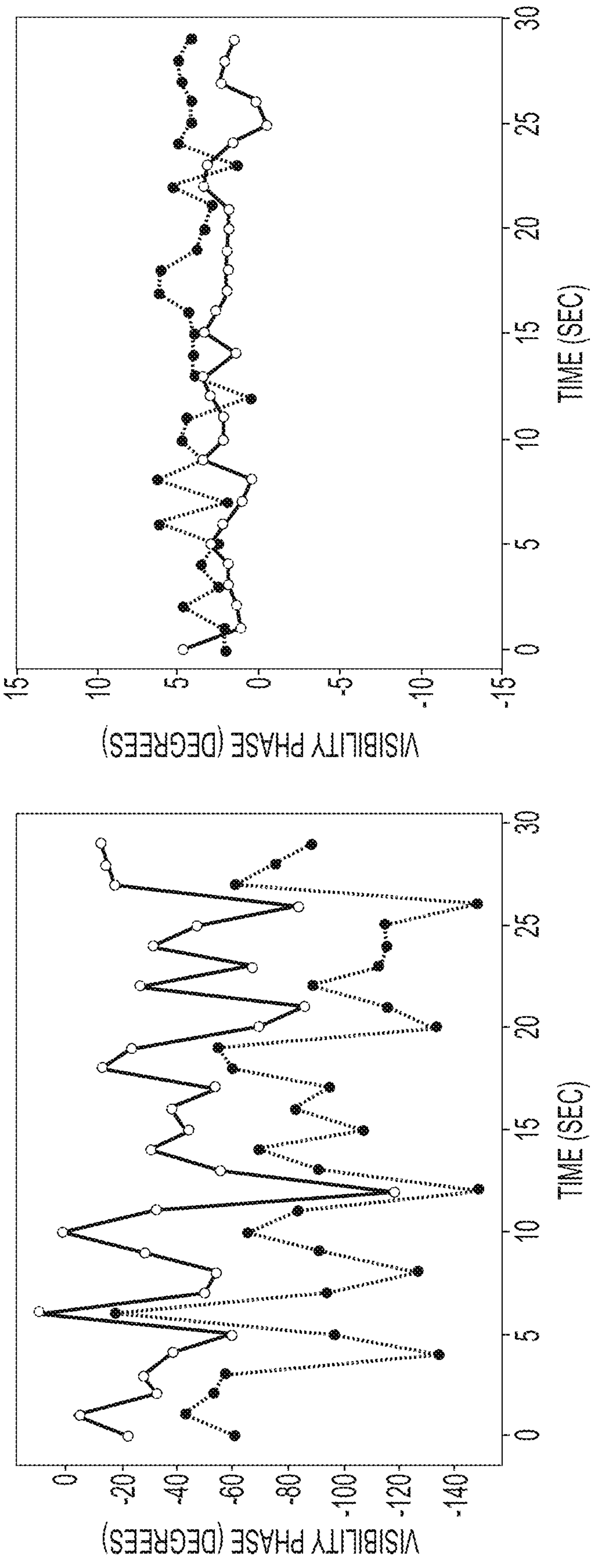
FIG. 14 depicts, on the left side a: visibility phase time series on two close and parallel baselines across the 7-hole mask before calibration. On the right side the same visibility phase is depicted, but after calibration. Note the range on the Y-axis is much larger for the left plot. The rms phase fluctuations are large before calibration (30°), and closely correlated between baselines, and the mean values are large (−40° and −85°). After calibration, the rms is much lower (1.2°), fluctuations are uncorrelated between baselines, and the mean values are close to zero.
Figure 15:
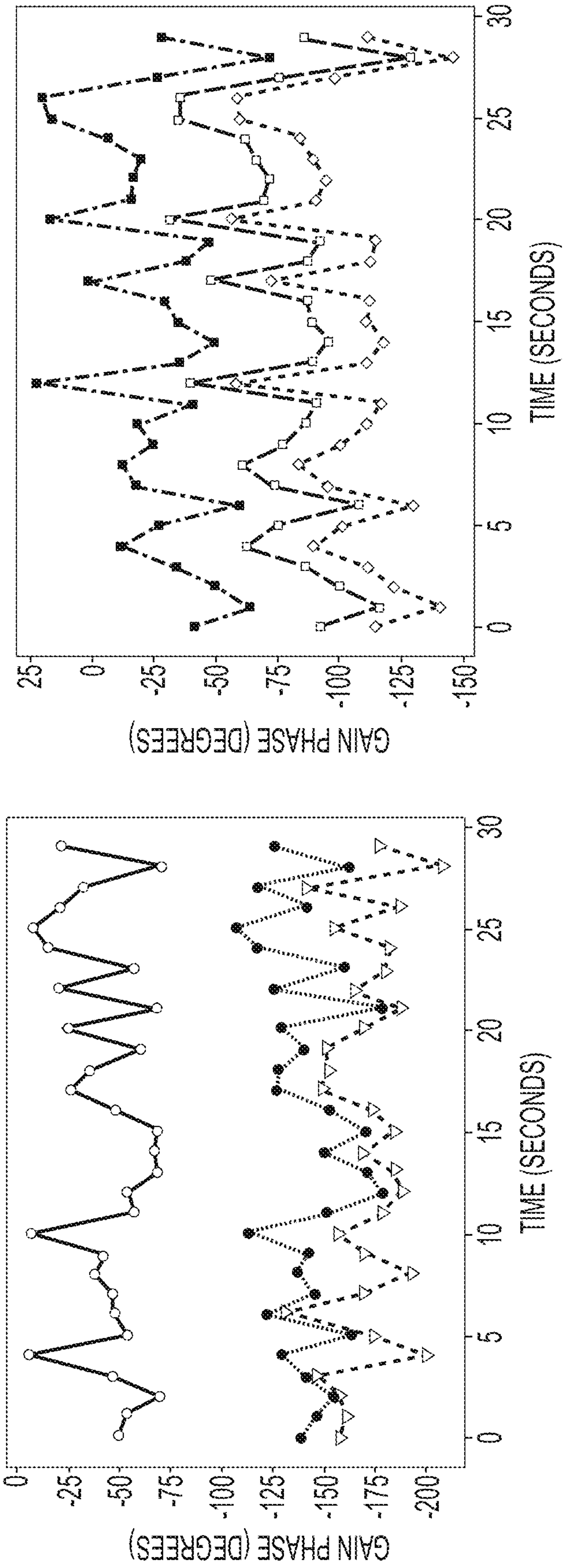
FIG. 15 depicts a gain phase solutions vs. time for 6 holes in a 7 hole mask. Neighboring holes on the left side of the mask are shown in the left plot (1=open triangle, 2=solid circle, 3=open circle), and the right plot shows the three neighboring holes on the right side of the mask (4=solid square, 5=open square, 6=open diamond; hole 0 is the phase reference hole with gain phase of 0o by construction). Note how the gain phase time series correlate closely for neighboring holes (correlation coefficients >5σ), while widely separated holes show no gain phase correlation (<2σ).

FIG. 12 shows a schematic of a distorted wavefront through the optical system before encountering the aperture mask. The self-calibration phase solutions relate linearly to these wavefront path-length distortions through equation 5, and hence represent a precise method for wavefront sensing. Note that path-length distortions are measured relative to a reference position in the mask, since phase, or path-length delay, is always a difference measurement with respect to a reference position. The wavefront is comprised of millions of incoherent photons, for which absolute phase is ill-defined, but phase difference between spatial positions in the mask remains a well-defined quantity allowing for mutual coherence and application of the van Cittert-Zernike theorem for Fourier imaging.

Figure 7:
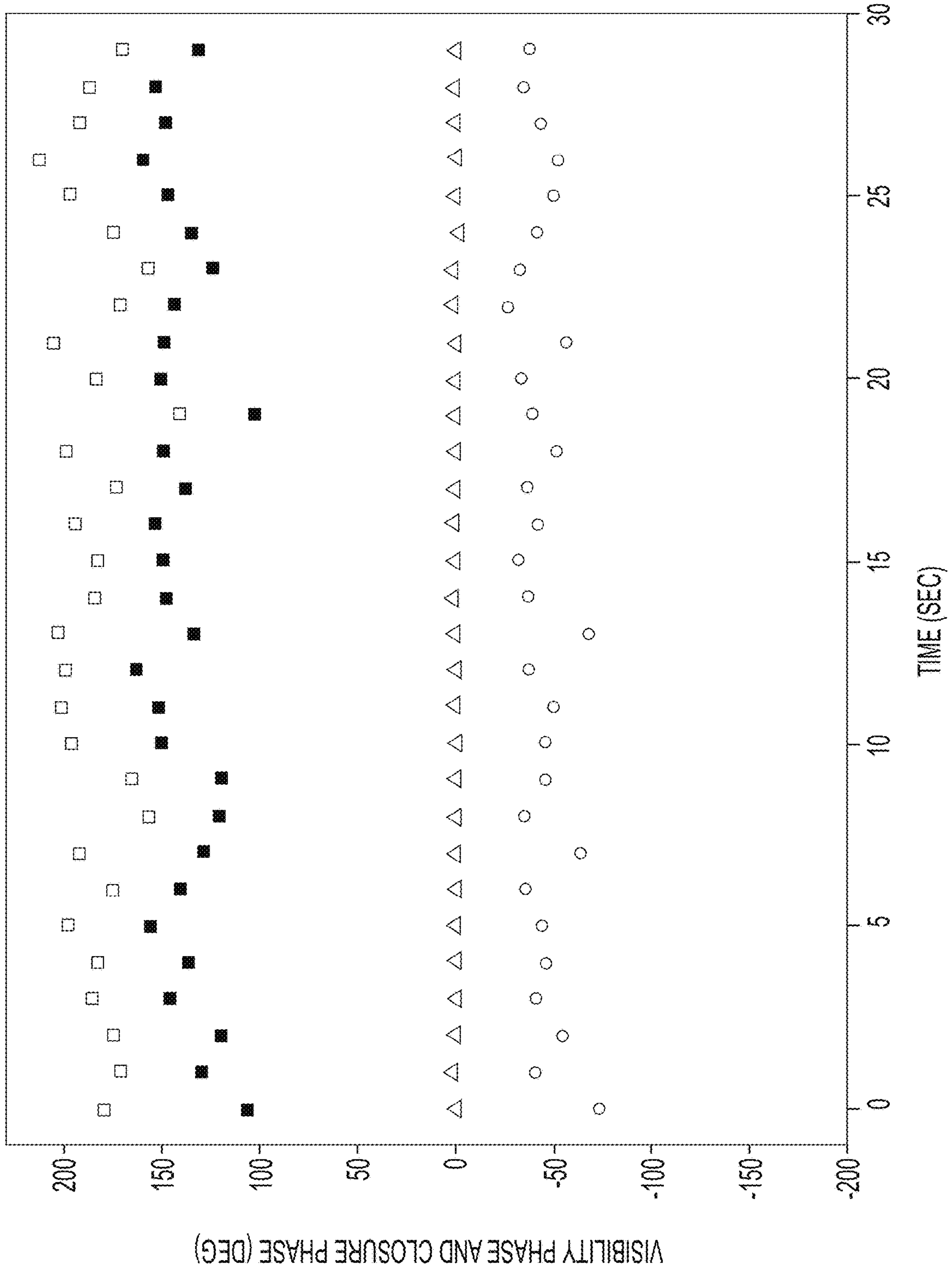
FIG. 7 depicts visibility and closure phase on one closed triad of Fourier samples (holes 1,2,3) for the 5-hole mask, after Airy centering. With: open triangle: Closure phase for triad 1-2-3, with mean=0.46° and RMS over the time series of 0.49°; filled square: visibility phase for baseline 1-3 with mean=139.4° and RMS=15°; open circle: visibility phase for baseline 2-3 with mean=−43.8° and RMS=11°; and open square: visibility phase for baseline 1-2 with mean=183.7° and RMS=16°.

For self-calibration to succeed, the phase errors should be restricted to contributions separable into hole-based terms, as per Equation (2). A demonstration of such errors is performed by looking at the phase closure values for closed triads of elements (see Equation (3)). FIG. 7 shows the visibility phases and closure phases for the closed triad of apertures 1-2-3 for a 5-hole mask for a time series of 30 exposures. The visibility phases show large scatter, with an RMS over the time series >30°. The closure phase is close to zero, and remarkably stable, with an RMS of 0.3°. Hence, the phase errors can be factored into hole-based terms and self-calibration is viable. Further, the fact that the rms fluctuations for the closure phase are much lower than for the individual visibility phase time series implies that the fluctuations of the visibility phases represent real path-length variations in the system due to vibration of the optics and/or turbulence.

Figure 8:
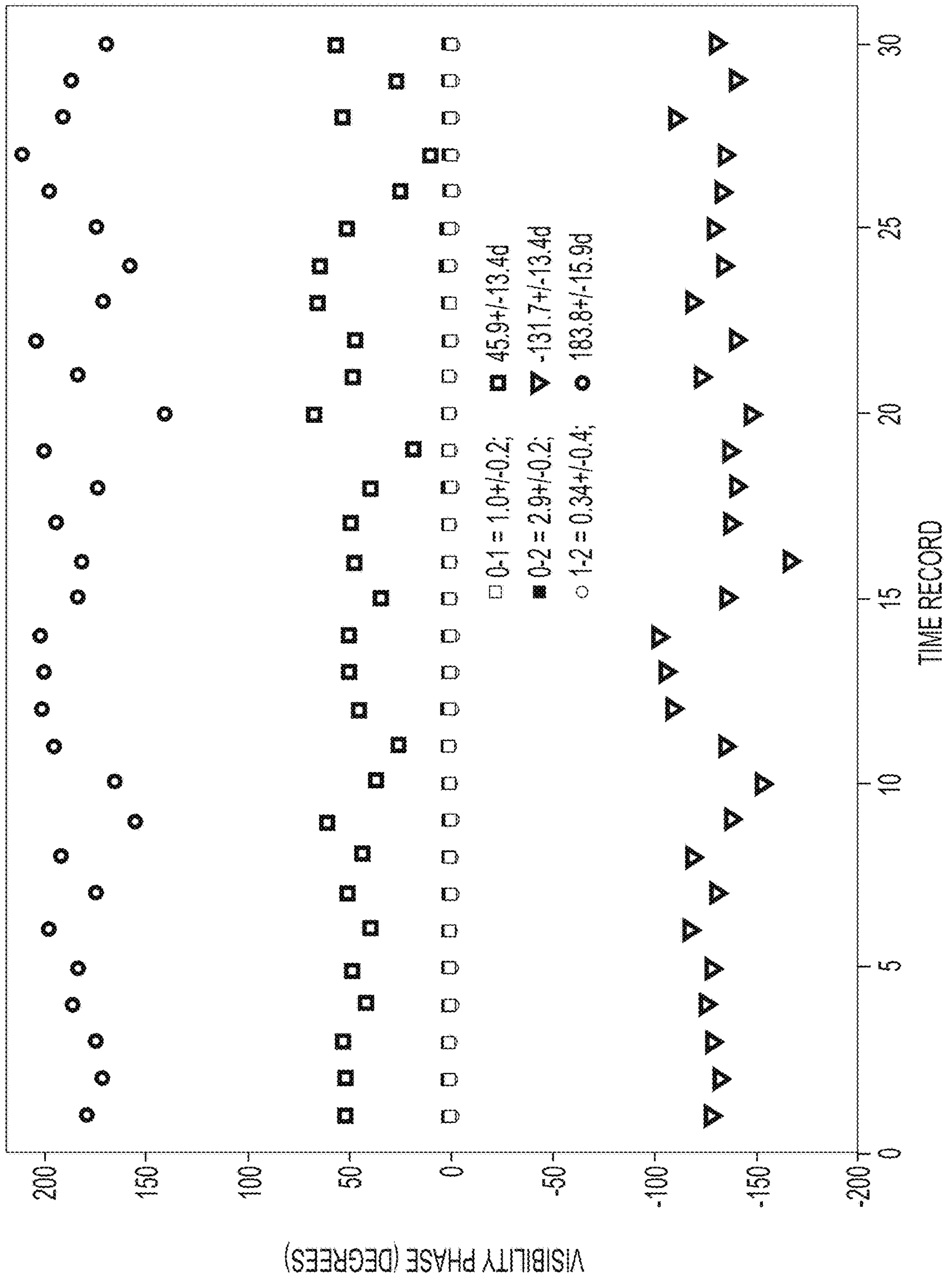
FIG. 8 depicts an example of the time series of visibility phases for three baselines in the 5-hole mask without self-calibration (bold lines), and with self-calibration using a Gaussian model at the image center (thin lines and filled square). The self-calibration leads to near-zero mean in the phases, and a much smaller RMS scatter.

FIG. 8 shows the visibility phases for three baselines before and after phase calibration. The phase variations are greatly reduced, and the visibility phases all converge to zero, as expected for a symmetric Gaussian source model at the image center. FIG. 9 shows the hole-based phase gain terms for the time series for the five-hole mask. Note that hole 0 was chosen for phase-reference, and hence has zero phase, by definition. The mean hole gain phases (relative to hole 0) and RMS scatter are listed on the figure.

Figure 10:
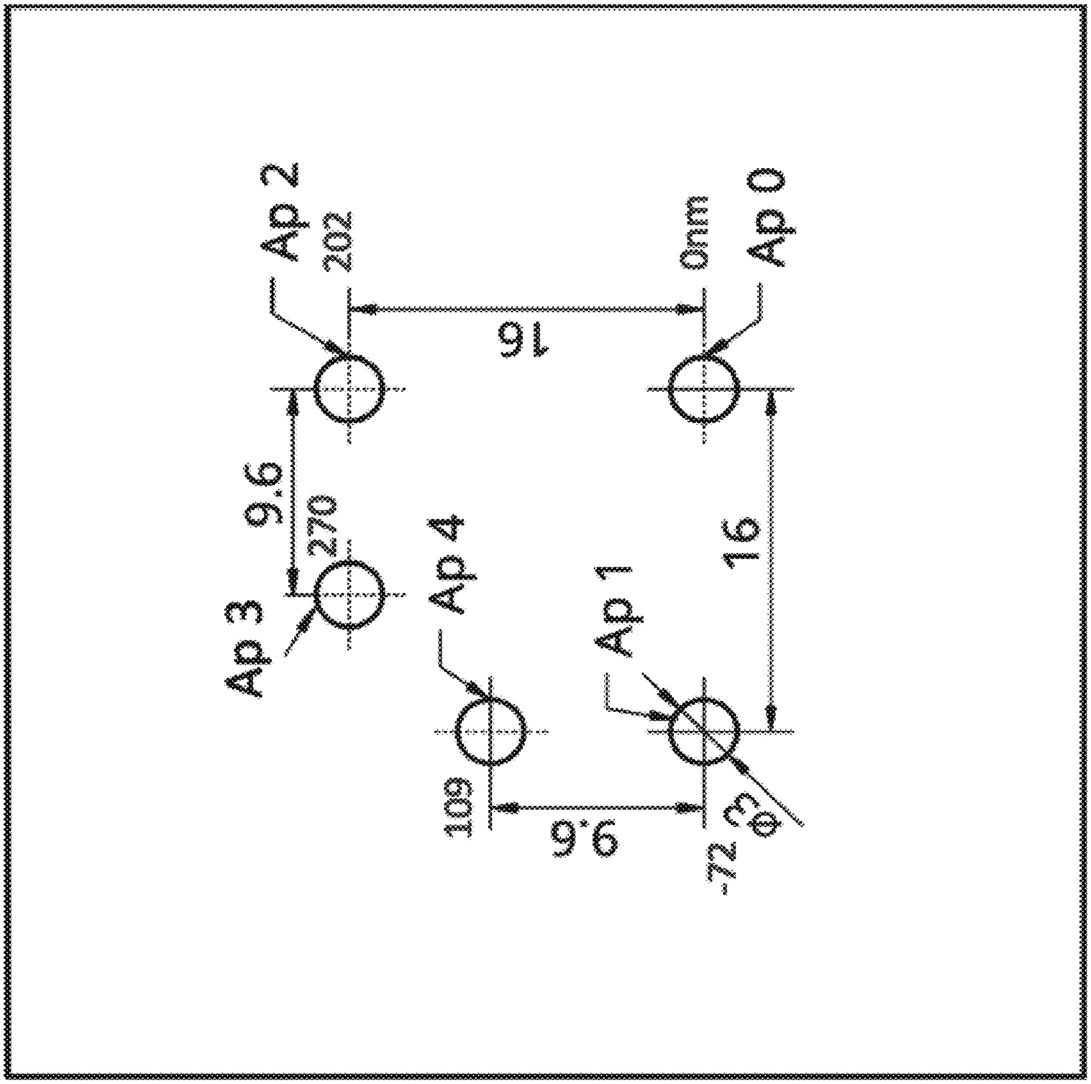
FIG. 10 depicts a 5-hole mask with a mean path-length solution derived from the hole-based phase gains, in nanometers.
Figure 11:
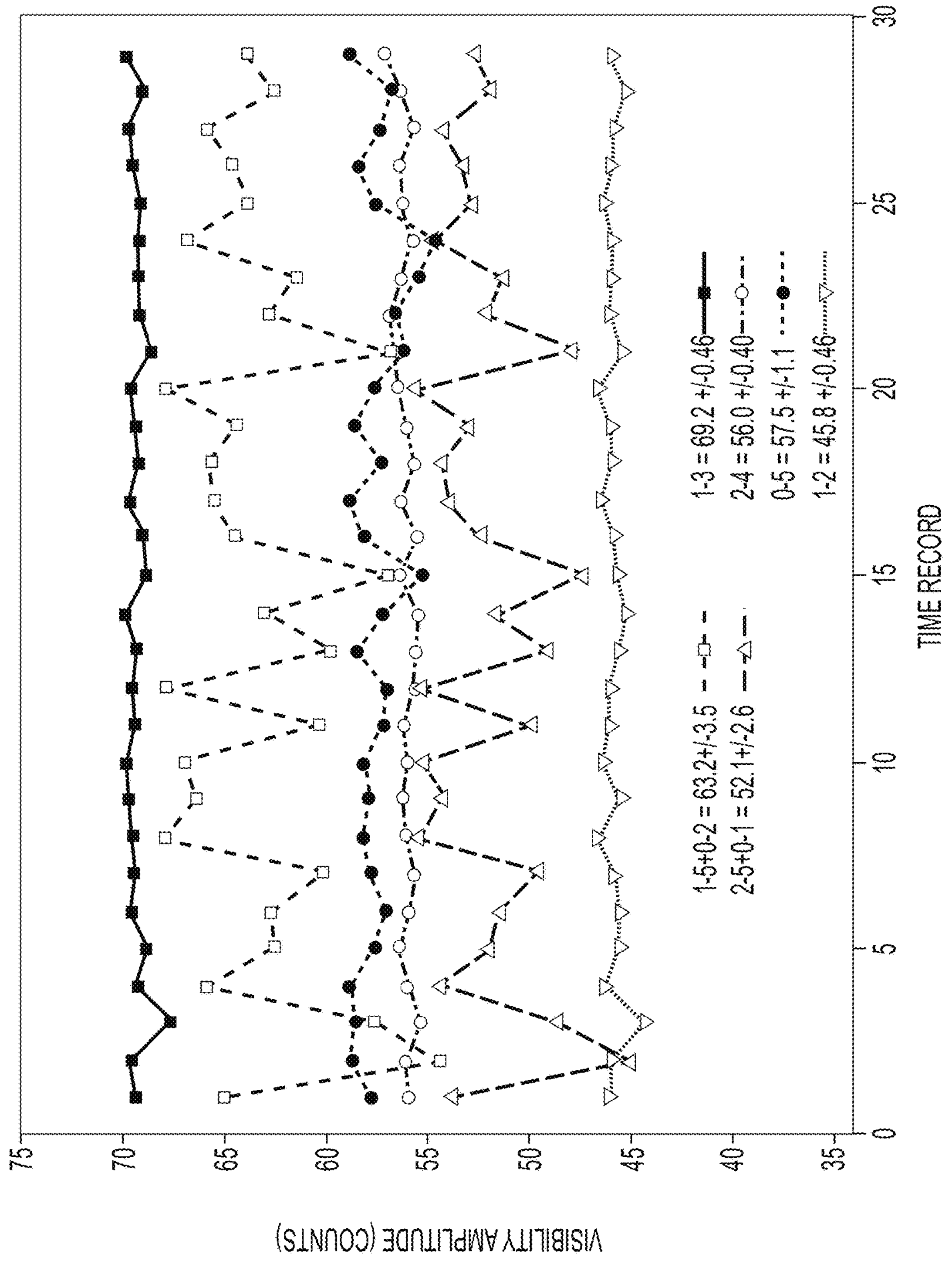
FIG. 11 depicts visibility amplitudes for the time series for a 6-hole interferometric mask. Shown are both redundant (open square, open triangle) and non-redundant baselines.

The mean phases can be related to physical path-length differences for the light propagation via Equation (5). FIG. 10 shows the mean phase offsets for each hole converted to nanometers of excess path-length for a 5-hole mask. There is evidence for a phase gradient, or path-length gradient, across the mask which preferably relates to the overall system. The RMS scatter in the hole-based phase gains is typically about 15°, which implies 22 nm in path-length changes. These mean phases represent static path-length differences across the mask induced by imperfections in the optics.

FIG. 6 shows the visibility phases for two close, parallel baselines before and after phase calibration using a 7-hole mask at 400 nm wavelength. The phase variations before calibration are large (rms=) 30°, and the mean phases are far from zero (−40° and)−90°. After calibration, the rms variations are reduced to 1.2°, and these variations are not correlated between baselines. Also, after calibration, the mean visibility phase values are close to zero, as expected for a symmetric Gaussian source model at the image center.

The fact that, before calibration, the visibility phase variations are strongly correlated between close, parallel baselines that do not share a hole implies that the variations are not random noise, but have some spatial coherence, as expected for vibration of optical components, or laboratory turbulence. Further, the fact that phase variations of the time series after calibration are reduced by a factor 30, and not correlated between baselines, implies that the pre-calibration phase fluctuations are being measured at high significance.

FIG. 7 shows the hole-based phase gain terms for the time series for a 7-hole mask experiment. The time series of the gain phases show substantial scatter (rms of 20° or more) and are strongly correlated between holes with small separations (correlation coefficient >5σ), while widely separated holes have no correlation (<2σ). Again, this gain phase jitter represents path-length fluctuations due to vibration of optical components, and/or turbulence in the laboratory atmosphere.

The mean gain phases differ between holes by over 100°. These mean phases represent static path-length differences for the light propagation through the optical system to each hole via equation (5).

The precision of the proposed wavefront sensing using self-calibration gain phases is considered. The residual rms phase fluctuations on the visibilities after calibration sets the noise floor on the phase gain solutions. Given that each gain phase solution employs 6 visibilities with random, uncorrelated phase noise at the level of 1.2°, as measured using the post-calibration visibilities, implies, assuming Gaussian random noise, that the rms limit to the gain phase solutions is roughly 1.2°/root (6)=0.5°. Using equation 5 and using a wavelength of 400 nm (which was the wavelength of the 7-hole experiment), implies a rms precision for the wavefront path-length determination of 0.6 nm. This gain phase precision is supported by the closure phase measurements (FIG. 7): again, closure phases are invariant to element-based gain phases, and the closure phase time series shows a temporal rms of 0.3°, as seen in FIG. 7.

In terms of dynamic range (maximum path-length differences) set by phase wraps, adding a frequency axis to the analysis would increase substantially the dynamic range of path-length measurements. For instance, making two measurements separated by 5% in frequency increases the dynamic range by a factor 20.

The 2D non-redundant interferometric mask along with the self-calibration of the system provides an accurate measure of the Gaussian source size and shape for the synchrotron radiation light source. The process can be implemented on short timescales (milliseconds) to obtain the 2D Gaussian source profile. The use of the non-redundant mask preferably avoids decoherence due to phase fluctuations inherent in masks with redundantly sampled baselines. The use of self-calibration corrects for non-uniform illumination across the mask. The hole amplitude gain solutions are a measure of the voltage illumination pattern across the mask. The hole phase gain solutions provide a sensitive wavefront sensor for electromagnetic path-length differences across the mask, both static and variable. Accuracy to a small fraction of a wavelength is possible, corresponding to sub-nanometer wavefront precision.

The method is extendable to more complex source structure by using non-redundant masks with more holes plus Fourier imaging and deconvolution, as long as the number of measured visibilities is greater than or equal to the number of degrees of freedom in the source model plus the number of gain terms. The method is not limited to visible wavelengths but can also be applied from infrared through ultraviolet light.

An independent method of source shape determination is through use of closure amplitudes. Closure amplitudes are a combination of visibility amplitudes that are invariant to element-based voltage gains. Closure amplitudes can be used in an optimization process assuming a shape that is a Gaussian or another parametric form to derive the source size and shape parameters provided the number of degrees of freedom in the shape parameters are lesser than or equal to the number of independent closure amplitude measurements.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A non-invasive method of determining characteristics of a light source, comprising the steps of:

placing a non-redundant aperture mask in a path of light emanating from the light source, wherein, as the light passes through the non-redundant aperture mask, an interference pattern is created;

capturing an image of the interference pattern on a camera;

generating visibilities of the light distribution from the image; and determining the characteristics of the light source based on the visibilities of the light distribution.

2. The method of claim 1, wherein the non-redundant aperture mask has at least five apertures.

3. The method of claim 1, wherein each vector baseline separation between apertures in the non-redundant aperture mask is unique.

4. The method of claim 1, wherein the apertures of the non-redundant aperture mask are arranged in a two-dimensional pattern.

5. The method of claim 1, wherein the step of generating visibilities of the light distribution from the image precedes a self-calibrating process.

6. The method of claim 5, wherein the self-calibration process comprises:

(a) assuming a model of the light source;

(b) deriving amplitude and phase corruptions of visibilities associated with each aperture in the non-redundant aperture mask;

(c) correcting the derived amplitude and phase corruptions of the visibilities;

(d) deriving a new model based on the corrected visibilities; and (e) repeating steps (b)-(d) to converge on the characteristics of the light source.

7. The method of claim 6, wherein the assumed model is a Gaussian model.

8. The method of claim 6, wherein, for a complex source, the assumed model is derived from Fourier imaging and deconvolution using the visibilities.

9. The method of claim 6, wherein the correction of the amplitude corrects for the illumination pattern across the non-redundant aperture mask.

10. The method of claim 6, wherein the correction of the phase acts as a wavefront sensor and provides at least one of a measurement of the path-length distribution and fluctuations of the light across the non-redundant mask, including a measurement of the tip-tilt of optics, and a measurement of departures from planarity for propagating electromagnetic radiation.

11. The method of claim 6, wherein a number of visibility measurements is greater than a number of free parameters in the source model plus a number of element-based complex gains.

12. The method of claim 6, wherein both hole amplitude and phase gains are determined.

13. The method of claim 5, wherein the self-calibration process comprises performing a joint optimization of the Gaussian source size parameters and the hole amplitude gains based on the relationships between measured visibilities, true visibilities, and hole-based amplitude gains, or in which a model of a complex source is derived from Fourier imaging, self-calibration, and deconvolution using the self-calibrated visibilities.

14. The method of claim 1, further comprising:
deriving closure amplitudes from the visibilities, wherein the visibilities are uncalibrated; and
fitting a parametrized source brightness model to directly estimate the source size and shape parameters from the closure amplitudes without requiring self-calibration.

15. The method of claim 1, wherein the light source is a visible light source.

16. The method of claim 1, wherein the light source is one of a beam of relativistic electrons, a high energy particle accelerator, a medical beam radiation device, a free electron laser, or a laser induced plasma light source.

17. The method of claim 1, wherein the characteristics are at least one of size and shape of the light source.

18. The method of claim 1, further comprising positioning at least one of a lens, a magnifier, a polarizer, and a monochromatic filter between the light source and the camera.

19. The method of claim 1, wherein the visibilities are calculated based on Fourier transforms.

20. The method of claim 1, wherein the apertures of the non-redundant aperture mask are identical.

21. The method of claim 1, further comprising centering the interference pattern on a peak intensity of the image derived after smoothing the image with a Gaussian kernel.

22. The method of claim 1, further comprising:
determining hole phase gain solutions; and
providing a wavefront sensor for electromagnetic path-length differences across the mask.

23. A system for non-invasively determining characteristics of a light source, comprising:
a non-redundant aperture mask adapted to be placed in a path of light emanating from the light source;
a camera adapted to capture an image of an interference pattern created by the light passing through the non-redundant aperture mask; and
a processor coupled to the camera, wherein the processor:
generates visibilities of the light distribution from the image; and
determines the characteristics of the light source based on the visibilities of the light distribution.

24. The system of claim 23, wherein the non-redundant aperture mask has at least five apertures.

25. The system of claim 23, wherein each vector baseline separation between apertures in the non-redundant aperture mask is unique.

26. The system of claim 23, wherein the apertures of the non-redundant aperture mask are arranged in a two-dimensional pattern.

27. The system of claim 23, wherein the step of generating visibilities of the light distribution from the image precedes a self-calibrating process.

28. The system of claim 27, wherein, for the self-calibration process, the processor further:
(a) assumes a model of the light source;
(b) derives amplitude and phase corruptions of visibilities associated with each aperture in the non-redundant aperture mask;
(c) corrects the derived amplitude and phase corruptions of the visibilities;
(d) derives a new model based on the corrected visibilities; and
(e) repeats steps (b)-(d) to converge on the characteristics of the light source.

29. The system of claim 28, wherein the assumed model is a Gaussian model.

30. The system of claim 28, wherein, for a complex source, the assumed model is derived from Fourier imaging, self-calibration and deconvolution or the visibilities.

31. The system of claim 28, wherein the correction of the amplitude corrects the illumination pattern across non-redundant aperture mask.

32. The system of claim 28, wherein the correction of the phase acts as a wavefront sensor and provides at least one of a measurement of the path-length distribution and fluctuations of the light across the mask, including a measurement of the tip-tilt of optics, and a measurement of departures from planarity for propagating electromagnetic radiation.

33. The system of claim 28, wherein a number of visibility measurements is greater than a number of free parameters in the source model plus a number of element-based complex gains.

34. The system of claim 28, wherein the processor further determines both hole amplitude and phase gains.

35. The system of claim 27, wherein, for the self-calibration process, the processor further performs a joint optimization of the Gaussian source size parameters and the hole amplitude gains based on the relationships between measured visibilities, true visibilities, and hole-based amplitude gains, or derives a model of a complex source from Fourier imaging, self-calibration, and deconvolution of the complex visibilities.

36. The system of claim 23, wherein the processor further:
derives closure amplitudes from the visibilities, wherein the visibilities are uncalibrated; and
fits a parametrized source brightness model to directly estimate the source size and shape parameters from the closure amplitudes without requiring self-calibration.

37. The system of claim 23, wherein the light source is a visible light source.

38. The system of claim 23, wherein the light source is one of a beam of relativistic electrons, a high energy particle accelerator, a medical beam radiation device, a free electron laser, or a laser induced plasma light source.

39. The system of claim 23, wherein the characteristics are at least one of size, shape, and position of the light source.

40. The system of claim 23, further comprising at least one of a lens, a magnifier, a polarizer, and a monochromatic filter positioned between the light source and the camera.

41. The system of claim 23, wherein the visibilities are calculated based on Fourier transforms.

42. The system of claim 23, wherein the apertures of the non-redundant aperture mask are identical.

43. The system of claim 23, wherein the processor further centers the interference pattern on a peak intensity of the image derived after smoothing the image with a Gaussian kernel.

44. The system of claim 23, wherein the processor further:
determines hole phase gain solutions; and
provides a wavefront sensor for electromagnetic path-length differences across the mask.

* * * * *